United States Patent
Horvitz

(10) Patent No.: US 8,249,060 B1
(45) Date of Patent: Aug. 21, 2012

(54) METADATA SCHEMA FOR INTERPERSONAL COMMUNICATIONS MANAGEMENT SYSTEMS

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1191 days.

(21) Appl. No.: 11/464,153

(22) Filed: Aug. 11, 2006

Related U.S. Application Data

(62) Division of application No. 10/187,078, filed on Jun. 28, 2002.

(51) Int. Cl.
*H04L 12/66* (2006.01)
*H04L 12/56* (2006.01)
*G06F 15/16* (2006.01)

(52) U.S. Cl. .................. 370/356; 370/392; 709/245

(58) Field of Classification Search .............. 370/352; 709/230, 246, 250; 398/115, 116, 118
See application file for complete search history.

(56) References Cited

U.S. PATENT DOCUMENTS

| | | | |
|---|---|---|---|
| 3,692,989 A | 9/1972 | Kandiew | |
| 4,153,932 A | 5/1979 | Dennis et al. | |
| 4,672,632 A | 6/1987 | Anderson | |
| 4,791,561 A | 12/1988 | Huber | |
| 5,493,692 A | 2/1996 | Theimer et al. | |
| 5,513,126 A | 4/1996 | Harkins et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,615,342 A | 3/1997 | Johnson | |
| 5,623,422 A | 4/1997 | Williams | |
| 5,675,704 A | 10/1997 | Juang et al. | |
| 5,675,779 A | 10/1997 | Doktor | |
| 5,689,642 A | 11/1997 | Harkins et al. | |
| 5,790,801 A | 8/1998 | Funato | |
| 5,794,210 A | 8/1998 | Goldhaber et al. | |
| 5,805,581 A | 9/1998 | Uchida et al. | |
| 5,809,251 A | 9/1998 | May et al. | |
| 5,812,865 A | 9/1998 | Theimer et al. | |
| 5,841,854 A | 11/1998 | Schumacher et al. | |
| 5,859,979 A | 1/1999 | Tung et al. | |
| 5,893,075 A | 4/1999 | Plainfield et al. | |
| 5,931,913 A | 8/1999 | Meriwether et al. | |
| 5,960,423 A | 9/1999 | Chaudhuri et al. | |
| 5,963,910 A | 10/1999 | Ulwick | |
| 6,014,135 A | 1/2000 | Fernandes | |
| 6,014,669 A | 1/2000 | Slaughter et al. | |

(Continued)

FOREIGN PATENT DOCUMENTS

EP 1594070 A2 9/2005
(Continued)

OTHER PUBLICATIONS

OA dated Nov. 13, 2008 for U.S. Appl. No. 11/250,848, 18 pages.
(Continued)

*Primary Examiner* — Melanie Jagannathan

(57) ABSTRACT

A system and method for generating, managing and accessing a schema that facilitates maximizing utility of a managed communication is provided. The system provides a computer-based system for creating, accessing and/or managing a schema employed in utility-optimizing communication management. The system includes computer components for receiving communication related data and storing such communication related data, inferences concerning such data, probabilities and/or probability distributions associated with such data in an extensible, portable, data schema. The schema can facilitate making utility optimizing communication management decisions.

20 Claims, 21 Drawing Sheets

U.S. PATENT DOCUMENTS

| | | |
|---|---|---|
| 6,029,195 A | 2/2000 | Herz |
| 6,032,189 A | 2/2000 | Jinzenji et al. |
| 6,035,306 A | 3/2000 | Lowenthal et al. |
| 6,044,486 A | 3/2000 | Underseth |
| 6,073,142 A | 6/2000 | Geiger et al. |
| 6,112,098 A | 8/2000 | Flint et al. |
| 6,119,101 A | 9/2000 | Peckover |
| 6,127,946 A | 10/2000 | Tzidon et al. |
| 6,157,955 A | 12/2000 | Narad et al. |
| 6,163,683 A | 12/2000 | Dunn et al. |
| 6,167,253 A | 12/2000 | Farris et al. |
| 6,167,445 A | 12/2000 | Gai et al. |
| 6,167,450 A | 12/2000 | Angwin et al. |
| 6,181,684 B1 | 1/2001 | Turcotte et al. |
| 6,188,905 B1 | 2/2001 | Rudrapatna et al. |
| 6,212,550 B1 | 4/2001 | Segur |
| 6,216,111 B1 | 4/2001 | Walker et al. |
| 6,243,398 B1 | 6/2001 | Kahane et al. |
| 6,272,146 B1 | 8/2001 | Bowater et al. |
| 6,279,112 B1 | 8/2001 | O'Toole et al. |
| 6,285,987 B1 | 9/2001 | Roth et al. |
| 6,292,480 B1 | 9/2001 | May |
| 6,332,126 B1 | 12/2001 | Peirce et al. |
| 6,336,194 B1 | 1/2002 | Dahman et al. |
| 6,353,398 B1 | 3/2002 | Amin et al. |
| 6,385,454 B1 | 5/2002 | Bahl et al. |
| 6,421,655 B1 | 7/2002 | Horvitz et al. |
| 6,421,730 B1 | 7/2002 | Narad et al. |
| 6,438,217 B1 | 8/2002 | Huna |
| 6,438,603 B1 | 8/2002 | Ogus |
| 6,463,265 B1 | 10/2002 | Cohen et al. |
| 6,466,232 B1 | 10/2002 | Newell et al. |
| 6,493,685 B1 | 12/2002 | Ensel et al. |
| 6,513,046 B1 | 1/2003 | Abbott, III et al. |
| 6,549,915 B2 | 4/2003 | Abbott, III et al. |
| 6,571,216 B1 | 5/2003 | Garg et al. |
| 6,578,076 B1 | 6/2003 | Putzolu |
| 6,587,876 B1 | 7/2003 | Mahon et al. |
| 6,654,734 B1 | 11/2003 | Mani et al. |
| 6,658,095 B1 | 12/2003 | Yoakum et al. |
| 6,671,695 B2 | 12/2003 | McFadden |
| 6,672,506 B2 | 1/2004 | Swartz et al. |
| 6,684,238 B1* | 1/2004 | Dutta ............................ 709/206 |
| 6,697,840 B1 | 2/2004 | Godefroid et al. |
| 6,738,931 B1 | 5/2004 | Osborn et al. |
| 6,741,188 B1 | 5/2004 | Miller et al. |
| 6,747,675 B1 | 6/2004 | Abbott et al. |
| 6,751,636 B1 | 6/2004 | Mende, Jr. et al. |
| 6,757,294 B1* | 6/2004 | Maruyama .................... 370/432 |
| 6,763,195 B1* | 7/2004 | Willebrand et al. .......... 398/115 |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,826,540 B1 | 11/2004 | Plantec et al. |
| 6,837,436 B2 | 1/2005 | Swartz et al. |
| 6,839,554 B2 | 1/2005 | McDowell et al. |
| 6,842,877 B2 | 1/2005 | Robarts et al. |
| 6,957,248 B2 | 10/2005 | Quine et al. |
| 6,968,179 B1 | 11/2005 | De Vries |
| 6,988,132 B2 | 1/2006 | Horvitz |
| 7,010,501 B1 | 3/2006 | Roslak et al. |
| 7,010,600 B1 | 3/2006 | Prasad et al. |
| 7,035,923 B1 | 4/2006 | Yoakum et al. |
| 7,040,541 B2 | 5/2006 | Swartz et al. |
| 7,046,680 B1 | 5/2006 | McDysan et al. |
| 7,063,263 B2 | 6/2006 | Swartz et al. |
| 7,085,786 B2 | 8/2006 | Carlson et al. |
| 7,103,806 B1 | 9/2006 | Horvitz |
| 7,149,795 B2 | 12/2006 | Sridhar et al. |
| 7,171,378 B2 | 1/2007 | Petrovich et al. |
| 7,185,073 B1 | 2/2007 | Gai et al. |
| 7,195,157 B2 | 3/2007 | Swartz et al. |
| 7,230,921 B2* | 6/2007 | Eriksson et al. ............... 370/230 |
| 7,373,379 B2 | 5/2008 | Comstock et al. |
| 7,385,501 B2 | 6/2008 | Miller et al. |
| 7,389,319 B2 | 6/2008 | Barr et al. |
| 7,742,591 B2 | 6/2010 | Paek et al. |
| 7,831,529 B2 | 11/2010 | Horvitz et al. |
| 7,831,532 B2 | 11/2010 | Horvitz |
| 7,870,240 B1 | 1/2011 | Horvitz |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0112056 A1 | 8/2002 | Baldwin et al. |
| 2002/0118772 A1 | 8/2002 | Lin |
| 2002/0138572 A1 | 9/2002 | Delany et al. |
| 2002/0156879 A1 | 10/2002 | Delany et al. |
| 2002/0161862 A1 | 10/2002 | Horvitz |
| 2002/0174199 A1 | 11/2002 | Horvitz |
| 2003/0004679 A1 | 1/2003 | Tyron et al. |
| 2003/0023711 A1 | 1/2003 | Parmar et al. |
| 2003/0033421 A1 | 2/2003 | Haeri et al. |
| 2003/0041156 A1* | 2/2003 | Pickover et al. ............... 709/230 |
| 2003/0046401 A1 | 3/2003 | Abbott et al. |
| 2003/0097485 A1 | 5/2003 | Horvitz et al. |
| 2003/0139970 A1 | 7/2003 | Badura et al. |
| 2003/0154476 A1 | 8/2003 | Abbott, III et al. |
| 2003/0191676 A1 | 10/2003 | Templeton |
| 2004/0143636 A1 | 7/2004 | Horvitz et al. |
| 2004/0201500 A1 | 10/2004 | Miller et al. |
| 2005/0034078 A1 | 2/2005 | Abbott et al. |
| 2005/0165860 A1 | 7/2005 | Cabrera et al. |
| 2005/0193102 A1 | 9/2005 | Horvitz |
| 2005/0223043 A1 | 10/2005 | Randal et al. |
| 2005/0266858 A1 | 12/2005 | Miller et al. |
| 2005/0272442 A1 | 12/2005 | Miller et al. |
| 2006/0019676 A1 | 1/2006 | Miller et al. |
| 2006/0041648 A1 | 2/2006 | Horvitz |
| 2008/0090591 A1 | 4/2008 | Miller et al. |
| 2008/0091537 A1 | 4/2008 | Miller et al. |
| 2008/0104517 A1 | 5/2008 | Horvitz |
| 2008/0134069 A1 | 6/2008 | Horvitz |
| 2008/0140776 A1 | 6/2008 | Horvitz |
| 2008/0161018 A1 | 7/2008 | Miller et al. |

FOREIGN PATENT DOCUMENTS

| | | |
|---|---|---|
| WO | 9800787 | 1/1998 |

OTHER PUBLICATIONS

Eric Horvitz, Principles of Mixed Initiative User Interfaces, 1999, Conference on Human Factors in Computing Systems archive Proceedings of the SIGCHI conference on Human factors in computing systems: the CHI is the limit, ISBN:0-201-48559-1, pp. 159-166.

OA dated Jan. 6, 2009 for U.S. Appl. No. 11/464,151, 57 pages.

OA dated Jan. 6, 2009 for U.S. Appl. No. 11/464,157, 61 pages.

Harry Newton, Newton's Telecom Dictionary, Feb. 2002, CMP Books, Eighteenth Edition, pp. 123-124.

OA dated Jan. 28, 2009 for U.S. Appl. No. 11/047,066, 73 pages.

OA dated Jan. 16, 2009 for U.S. Appl. No. 11/047,130, 61 pages.

OA dated Jan. 16, 2009 for U.S. Appl. No. 11/047,318, 65 pages.

OA dated Jan. 15, 2009 for U.S. Appl. No. 11/047,228, 61 pages.

Bhattacharya, et al., Coordinating Backup/Recovery and Data Consistency between Database and File Systems, Jun. 4-6, 2002, 12 pages, ACM SIGMOND, Madison Wisconsin, USA.

Hewlett-Packard Development Company, LP., Sybase Database Migration, 2004, 19 pages.

Planning Protection Schedules, Published Apr. 8, 2005, Updated Aug. 17, 2005, 5 pages. http://www.microsoft.com/technet/prodtechnol/dpm/proddocs/7f70f48c-6661-4573-ac17-47.

Webster's II New Riverside University Dictionary, Houghton Mifflin Company, 1994, pp. 496. In OA Dated Aug. 11, 2008 for U.S. Appl. No. 11/250,848, 40 pages.

International Search Report dated Sep. 7, 2002 for PCT Application Serial No. PCT02/07894, filed Mar. 15, 2002.

OA Dated Oct. 16, 2008 for U.S. Appl. No. 10/036,566, 24 pages.

OA mailed Jun. 20, 2008 for U.S. Appl. No. 11/464,155, 20 pages.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, in Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189

Andrew Silver, John Larkins and Dave Stringer, "Unified Network Presence Management", Nortel Networks Wireless Solutions, 6 pages, No later than Dec. 2000.

European Search Report dated Aug. 28, 2003, for International Application Serial No. 02000906.4-1244-.

Kaushal Kurapati, et al., A Multi-Agent TV Recorder, Adaptive Systems Department, Philips Research Briarcliff, 2001, 8 pages.

Eric J. Horvitz et al., "Utility-Based Abstraction and Categorization", Palo Alto Laboratory, Rockwell International Research, 1993, 8 pages.

Eric J. Horvitz, et al., "Decision Theory in Expert Systems and Artificial Intelligence", Jul. 1988, 38 pages.

Eric Horvitz, et al., "Attention-Sensitive Alerting", Microsoft Research, Jul. 1999, 10 pages.

John R. Carlson et al., "Channel Expansion Theory and the Experiential Nature of Media Richness Perceptions", Academy of Management Journal, vol. 42, No. 2, Apr. 1999, 18 pages.

* cited by examiner

METADATA SCHEMA FOR INTERPERSONAL COMMUNICATIONS MANAGEMENT SYSTEMS

CROSS-REFERENCE TO RELATED APPLICATIONS

This application is a divisional application of U.S. patent application Ser. No. 10/187,078, entitled, "METADATA SCHEMA FOR INTERPERSONAL COMMUNICATIONS MANAGEMENT SYSTEMS", and filed on Jun. 28, 2002. The entirety of the aforementioned application is incorporated herein by reference. This application is also related to U.S. patent application Ser. No. 11/464,151, entitled, "METADATA SCHEMA FOR INTERPERSONAL COMMUNICATIONS MANAGEMENT SYSTEMS", and filed on Aug. 11, 2006, U.S. patent application Ser. No. 11/464,155, entitled, "METADATA SCHEMA FOR INTERPERSONAL COMMUNICATIONS MANAGEMENT SYSTEMS", and filed on Aug. 11, 2006, and U.S. patent application Ser. No. 11/464,157, entitled, "METADATA SCHEMA FOR INTERPERSONAL COMMUNICATIONS MANAGEMENT SYSTEMS", and filed on Aug. 11, 2006.

TECHNICAL FIELD

The present invention relates generally to communication management and more particularly to the definition, creation, management, transmission, and access of critical information about the nature, timing, and context of attempted communications.

BACKGROUND OF THE INVENTION

Conventionally, it has been difficult, if possible at all, to encode and execute expressive policies that allow communications systems to maximize utility of communications for participants within and across multiple communication devices, entry points, modalities, and times based on the preferences of contactor(s) and contactee(s), in a manner that takes into consideration a multitude of real-world factors about the nature and context of the communications and other factors associated with communications.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The subject invention facilitates communication management and provides for defining, creating, managing, transmitting, and accessing critical information about the nature and context of attempted communications. The invention makes use of standardized expressive communications metadata containing key value attributes that facilitate optimizing utility of managed communications within or across multiple modalities or devices based on preferences of contactor(s) and/or contactee(s). The invention takes into consideration contexts, identities, locations, initial and preferred channels or modalities of an interaction, content, costs, goals, device availabilities, participant availabilities and/or availability forecasts, and other information about the communication. Communication metadata [also referenced herein as "communication schema"] in accordance with the subject invention contains one or more fields for encoding multiple dimensions of information associated with a communication attempt by a person or agent, including data on identity, intentions, situation, etc. of the contactor(s) (e.g., the entity initiating the communication), and/or contactee(s) (e.g., the entity being contacted), and/or the nature of a task or content of a communication attempt. The communication schema is designed for employment in automated and/or manual decision making in a context- and preference-centric communication system. The schema provides a standard set of data appended with communications that facilitates routing, scheduling/re-scheduling, alerting, and display of the communication or information about the communication according to preferences and policies established by the contactee(s) and/or contactor(s). In some aspects of the system, the communication schema is used in tools that seek to optimize the expected utility of managed communications based on a number of different attributes or relevant data (e.g., preferences, contexts, and/or other communication related data).

The subject invention takes into consideration real-world factors that include information about identities or group memberships of one or more participants, history of communications, presence and/or availabilities of participants, initial selected modality and/or entry point, explicit or implicit purpose of the communications, access to encoding and/or rendering devices of participants, situations of participants, for example. There are often multiple means of communication available to individuals or entities in different settings. Also, recipients of communications may wish to accept, reject, or defer communications until a more convenient time, and/or redirect them to another channel or device. The present invention contemplates that an ideal channel and timing of communications depends partly on the context, content and goals of the communication, identities, and preferences of the contactee(s) and contactor(s).

The invention provides an architecture and an ability to encode or infer identity- and context- and content-sensitive communication policies that schedule, route, and/or display information to people or entities attempting to initiate communications, based on preferences. Conventionally, it has been difficult, if possible at all, to dynamically maximize if, when, and how communications are routed. There has not been a means for optimizing in a rich manner, the utility of communications based on preferences, context and other factors associated with communications. Such utility maximizing processing, if attempted at all, has been complicated by the lack of consistent portable data for use in expressing the preferences, important aspects of the situations of the contactor and contactees, and the nature and time criticality of the communications.

The challenge and opportunity for innovation with rich communication management systems is especially highlighted by the explosion of multiple communication modalities and devices, extending from email and instant messaging to telephone calls and real-time video conferencing. This explosion now includes the embedding of communication entry points into multiple devices and potentially, into a variety of software applications. For example, computer users editing a text document may desire to discuss a recent edit with the person who made that edit by invoking a simple point and click gesture. It has not been possible conventionally to encode rich policies that handle communications across multiple entry points, devices, modalities, and times as a function of the nature and context of the communicators and communications, and to harness the rich policies or decision procedures to make dynamic decisions about such actions as selection of the most appropriate channel, device, medium, route, and timing of the communications via automated rescheduling, based on predicted or known availabilities of the contactee(s).

Attempts to handle communications in a more context- and content sensitive manner, if attempted at all, has been complicated by the lack of consistent, expressive portable metadata about communicators and communications conventionally. The present invention addresses many of the shortcomings associated with conventional communications schemes. The invention provides for an expressive cross-device, cross-application communications schemata that encodes critical metadata about the nature and context of interpersonal or human-machine communications, as well as methods for instantiating, transmitting, accessing, interpreting, and storing such a consistent, expressive portable metadata (communications schema) that is invaluable in a rich, preference-centric communications system.

One technique for optimizing the value or expected utility of communications employs probability and utility-theoretic methods to maximize the expected utility of the communication to the contactor and/or the contactee, or that seeks to provide different amounts of value to the contactor or contactee based on a predefined or dynamically computed target weighting of value among the participants function that captures the value of the communication to both contactor and contactee. In such an approach, a Bayesian analysis of a rich set of evidential data associated with an attempted communication is analyzed to generate probability distributions over alternative outcomes and a communications policy is selected that maximizes some objective function capturing the expected utilities of participants. Such evidential data includes information linked with certainty or uncertainty to the preferences of participants when such preferences are unknown, context(s) of communicating parties, groups to which communicating parties belong, and other information. Such information is not always complete, thus, inferences concerning missing pieces of information are made. The present invention facilitates storing such a rich set of data, and storing the inferences made about such missing pieces of data in a manner that facilitates optimizing utility of a communication.

In one example of the present invention, preference data, context data, communication channel data and/or other relevant data is received by a schema generator that produces an XML schema suitable for use by a communication manager that employs Bayesian techniques in conjunction with a cost-benefit decision analysis to predict the utility of different communications undertaken at different times, between different communicating parties via different communication channels under different communication conditions. Such an XML schema can be stored, for example, in a binary large object (BLOB) that is accessible from distributed computer components that cooperate in identifying, selecting and managing a communication that considers the above-listed conditions. Making available the rich set of data, inferences made about missing pieces of data, and inferences that can be made about utility optimizing decisions associated with the data facilitates managing communications to achieve the desired utility optimization.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
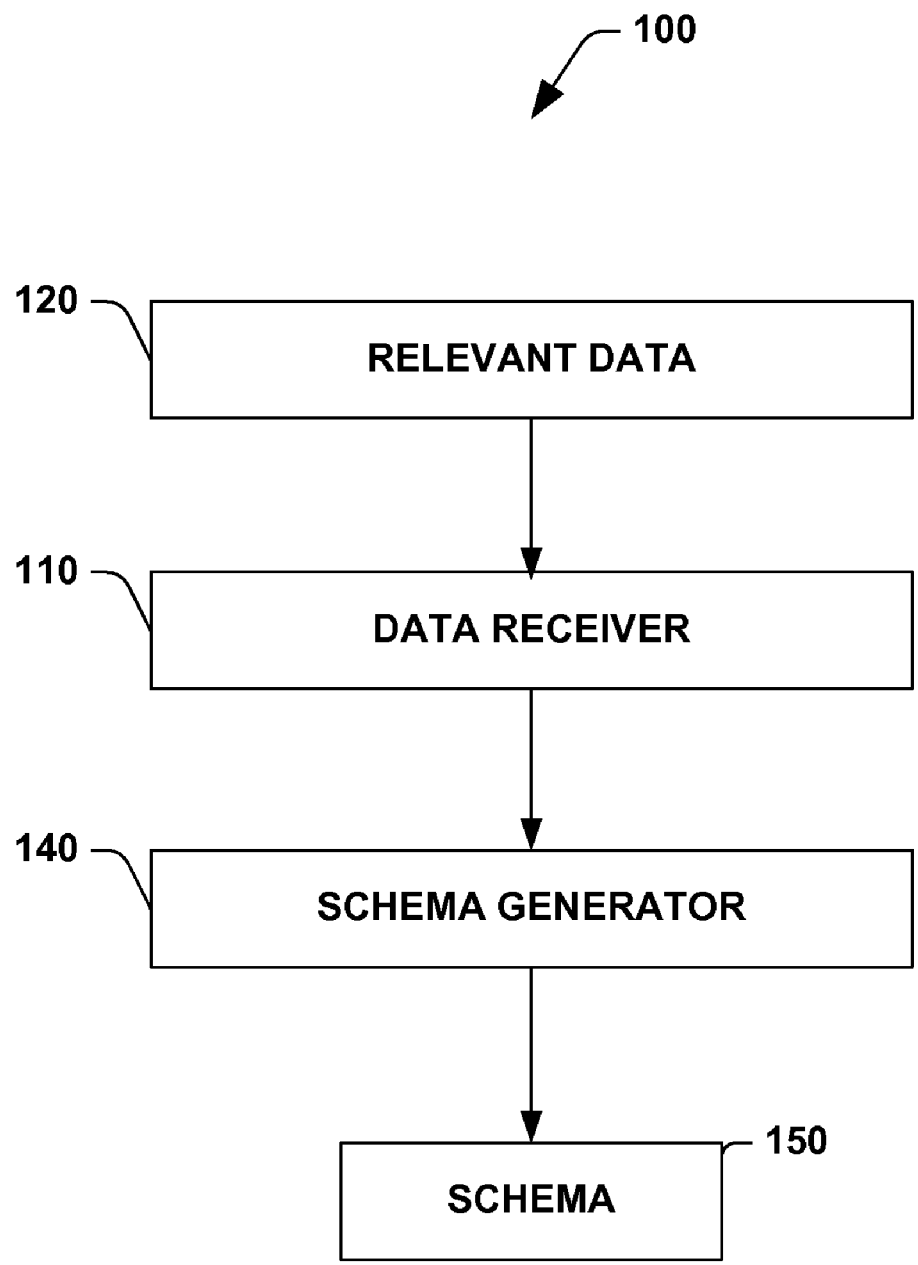
FIG. 1 is a block diagram that illustrates a system for generating a schema in accordance with an aspect of the present invention.

The present invention is now described with reference to the drawings, where like reference numerals are used to refer to like elements throughout. In the following description, for purposes of explanation, numerous specific details are set forth in order to provide a thorough understanding of the present invention. It may be evident, however, to one skilled in the art that the present invention can be practiced without these specific details. In other instances, well-known structures and devices are shown in block diagram form in order to facilitate description of the present invention.

As used in this application, the term "computer component" is intended to refer to a computer-related entity, either hardware, a combination of hardware and software, software, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

It is to be appreciated that various aspects of the present invention employ representations of deterministic policies specified as functions or rules that take as arguments contextual information, details about the nature of the participants, and the content or task at hand. One example of the present invention also employs technologies associated with facilitating inference and decision making under uncertainty and optimization of expected utility and/or minimization of expected costs. Thus, statistical inference can be performed with models constructed by hand, from data with machine learning methods, or by a mixture of machine learning and human assessment. Intelligent interpersonal communication systems can be centered completely on deterministic representations, specifications, and polices or be based completely on inferential systems, that reason under uncertainty and perform decision-theoretic analysis of the best policies. The latter systems tend to be deeper and more precise as they can represent uncertainty in observations about context, goals, and content. However, they also can pose more challenging assessment and user-configuration tasks. Variants can be constructed of interpersonal communication systems that draw on both deterministic policies and probabilistic methods. In some configurations, depending on the context, an inferential procedure or deterministic rule may be used.

Context can be abstracted by examining, for example, a communication sender, the relationship of the sender to a user, the groups in which the communication sender is a member, the time of day at which the sender is attempting to communicate, the task(s) with which the user and/or sender are engaged, the age of project(s) to which the user and/or sender are engaged, the sender and/or user location and so on. Thus, multiple attributes concerning people, including their preferences, contexts, tasks and priorities are analyzed to facilitate establishing and adapting communication policies for people in the collections.

A variety of machine learning systems/methodologies including Bayesian learning methods that search over alternative dependency structures and apply a score (such as the Bayesian Information Criteria, etc.), Bayesian classifiers and other statistical classifiers, including decision tree learning methods, support vector machines, linear and non-linear regression, and neural network representations, can be employed to build and update inferential models.

Turning now to FIG. 1, a computer-based system 100 for generating a schema 150 is illustrated. The system 100 includes a data receiver 110 that receives information associated with relevant data 120 to facilitate communications between parties, wherein the relevant data can include one or more attributes that relate to a set of important information for decisions about the processing/routing of communications, whereby decision making is made in pursuit of timing, sharing of content, and the device/modality/channel employed that maximizes either the contactees or both the contactors and contactees expected utility. The relevant data 120 is part of a rich data set that can be received by the data receiver 110 and that can be stored in the schema 150. The schema 150 is generated by a schema generator 140 that stores the relevant data 120. The schema 150 is accessible by a communication management system to facilitate selecting a communication channel, a communication time, and/or a communication group that optimizes utility of a communication.

The schema 150 is employed in utility-optimizing communication management and, in one example of the present invention, the schema is an XML (Extensible Markup Language) schema. In another example of the present invention, the schema is stored in a BLOB (binary large object).

The relevant data 120 (also referred to as data 120) can include preference data concerning how communicating parties prefer to communicate, with those preferences varying with respect to, for example various communicating parties, various times, various channels and various topics of communication. Therefore, the data 120 includes, but is not limited to, preferences concerning the time of day for communicating (e.g., early morning, business hours, evening, late night, sleeping hours), the time of the week for communicating (e.g., Monday through Friday, Weekend, Holiday, Vacation), identity of contactors (e.g., employer, employees, critical colleague, colleague, peers, nuclear family, extended family, close friends, friends, acquaintances, others), hardware currently available or available within a time horizon of a communication attempt (e.g., desktop, laptop, home computer), preferred software (e.g., email, word processing, calendaring), preferred communication policy (e.g., low priority, medium priority, high priority, breakthrough priority, and preferred interruptability (e.g., do not interrupt while focused on work, only interrupt while not focused), for example. Thus, one example of the present invention facilitates generating a schema 150 that stores such data 120 and/or inferences concerning such data 120. The schema facilitates employing such stored data in utility optimizing channel management decisions. The schema generator 140 can parse the preferences, extract data that corresponds to element values and/or attribute values for elements and attributes identified in the schema 150. Also, the schema generator 140 can identify data for which new elements and/or attribute definitions are produced for the schema 150.

The relevant data 120 can include context information that captures information about the situation (s) in which a communicating party is found and the environment in which a communicating party operates, for example. The data 120, therefore, can generally be related to observations about communicating parties. For example, observations concerning the type of activity in which a party is involved (e.g., on task, not on task), location of the party (e.g., office, home, car, shower), calendar (e.g., appointment status, appointment availability), history of communications (e.g., have replied to email in the past, have spoken to on the telephone recently, the utility of the interaction, the duration of the interaction), background ambient noise at a location, number of hours at work that day and attentional status (e.g., high focus, focus, light focus, conversation with another person, light activity) may be captured by relevant data. The data 120 also relates to information including, but not limited to, hardware data (e.g., current/anticipated capacity, current/anticipated bandwidth, current/anticipated availability, current/anticipated status, current/anticipated cost, revision data, metadata), software data (e.g., current/anticipated capacity, current/anticipated bandwidth, current/anticipated availability, current/anticipated status, current/anticipated cost, revision data, metadata) and observed data. The schema generator 140 can parse the data 120, extract data that corresponds to element values and/or attribute values for elements and attributes identified in the schema 150. Also, the schema generator 140 can identify data for which new elements and/or attribute definitions are produced for the schema 150.

On some occasions, the potential set of relevant data that would be useful in decision making about the nature and timing of a communication 120 may be incomplete (e.g., video analysis data unavailable because video camera broken). Thus, the schema generator 140 can generate and the schema 150 can store data associated with probabilistic inferences about the states of the data, typically via the generation of a probability distribution over the states 120. Such inferences can be employed in reasoning concerning an optimal communication (e.g., optimal channel, time, parties) based on incomplete data. Thus, the data 120 can include information that facilitates producing probabilities associated with a missing data element. By way of illustration, the schema 150 can contain information for predicting the likelihood that a communicating party is in a high attentional state (a contextual property) even though a variable capturing a more precise information about a user's activities, such as data obtained via real-time gaze-tracking information is unavailable.

The data 120 can also include information concerning the long-term and/or acute, dynamically changing communication needs of a communicating party. By way of illustration, a communicating party may assign a high cost of interruption for some period of time (in a decision-analytic system), or assert (in a rule-based variant) that they desire to have no interruptions for the next hour (e.g., "hold everything unless high critical on this task or an hour from now"). One example of the present invention therefore facilitates generating a schema 150 that stores context data and/or inferences. The schema 150 thus facilitates using context data and inferences in utility optimizing channel management decisions.

The schema 150 can also store information that is to be applied to data stored in the schema 150 that is derived from the data 120. For example, one or more communication policies that can be applied to a communication can be stored in the schema 150. Such policies can include, for example, progression lists of preferred communication hardware to which communications at certain times or from certain parties are to be directed. By way of illustration, a communication policy titled "breakthrough" may be stored in the schema 150, where that policy includes a progression list of communication devices to which a user prefers emergency messages from a special group of people to be directed. For example, a breakthrough communication policy can be established and stored in the schema 150 whereby during the late stages of a high-risk pregnancy, any communication from the pregnant person, a set of proxies (e.g., immediate family of pregnant person), or medical personnel associated with the pregnancy will be successively routed through the most immediately available high priority communication devices (e.g., cell phone, pager, land line phone, runner) until the contactee is contacted, regardless of the context of the contactee (e.g., in a meeting). Policy assignment can be automated via the specification of higher-level policies that assign or modify rules about the handling of communications based in specific states. For example, an obstetrician may construct a policy about the handling of incoming calls from all patients who are pregnant woman, specifying that when any pregnant patient is in the last month of pregnancy, to automatically assign their calls to the category of real-time breakthrough communications. As another example, a user may desire to define a policy that assigns incoming communications as a being in the class of breakthrough communication when the person calling is someone they are scheduled to meet with in two hours, as gleaned automatically from their online calendar. By way of further illustration, a communication policy titled "low priority" can be stored in the schema 150 whereby any communication from a certain group of people will be routed to a list of low priority communication devices (e.g., voicemail, email) regardless of the context of the contactee (e.g., idle at desk).

In one example of the present invention, the communication policies can be implemented based on a logical TRUE result produced by a logical OR of one or more context data values. By way of illustration, the "low priority" communication policy can be invoked if the communication is from party A, party B or party C, OR the time is either time T1 or time T2. By way of further illustration, the "breakthrough" communication policy can be invoked if the communication is from party D, party E or party F, OR if the communication concerns topic X or topic Y. Thus, the logical OR of different values retrieved from the data 120 and stored in the schema 150 can be examined to determine whether to employ a specific communication policy stored in the schema 150.

One application of the schema 150 is by a communication management system that employs Bayesian techniques to select a communication channel that will optimize utility of a communication. Since such techniques can perform reasoning under uncertainty, and since the data 120 can be incomplete, the schema 150 can store data, inferences concerning missing pieces of data, inferences concerning utility optimizing decisions, cost data associated with utility optimizing decisions and benefit data associated with utility optimizing decisions. Furthermore, since such reasoning under uncertainty and Bayesian techniques can employ statistical analysis of data, the schema 150 can also store not only data from the data 120, but also probability distributions associated with such data.

It is noted that although relevant data 120 has been described in various aspects to facilitate communications, other forms of the data may be provided in accordance with the present invention. For example, relevant data can include notions of location and other factors such as:

a) contactor and contactee assertions about the cost of delayed or deferred communications, including notions of the specification of a time-based cost function, a deadline, an event (e.g., sometime before a meeting x);

b) private vs. public (that may influence the device and modality, per chatting in a public place, etc.).

Figure 2:
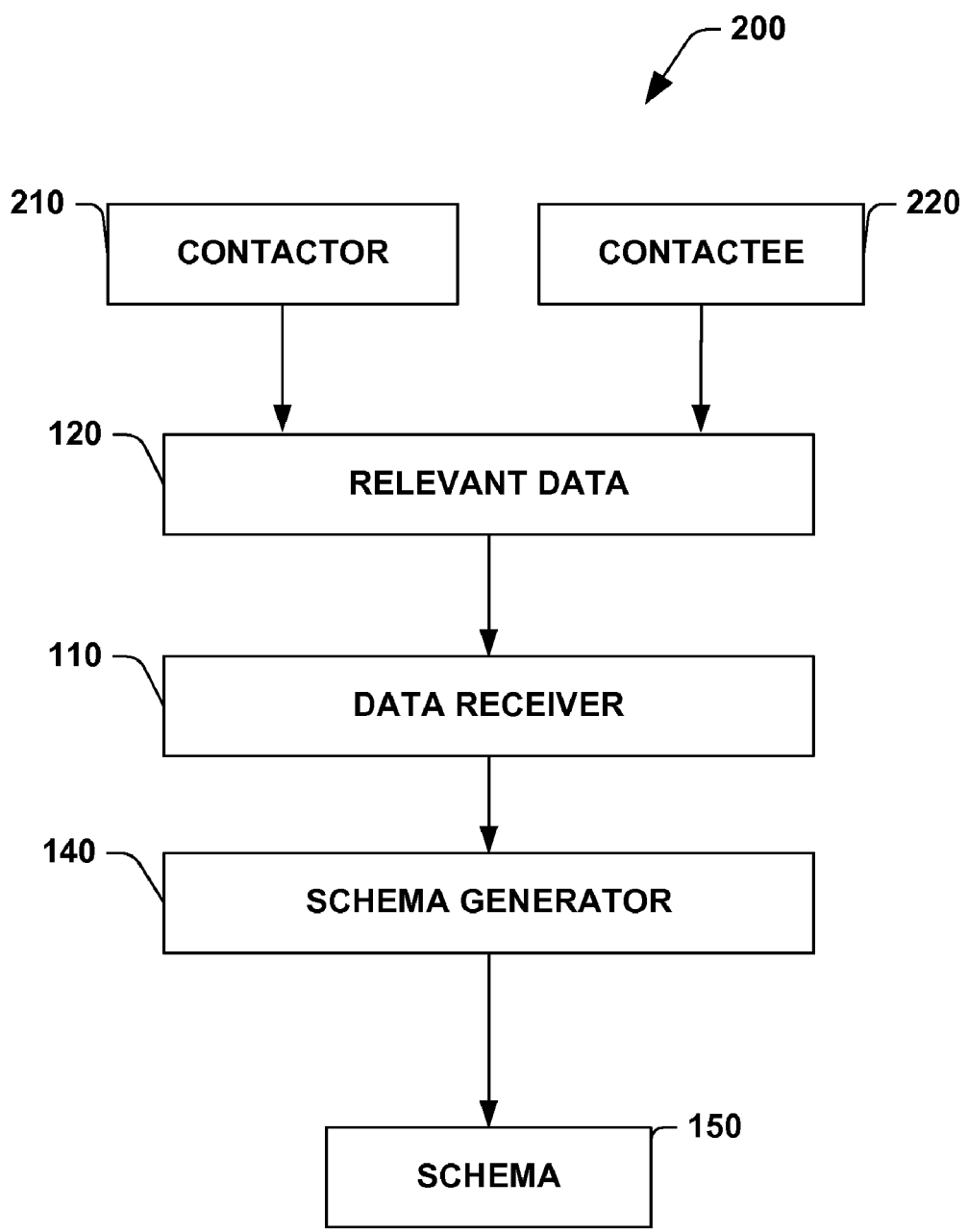
FIG. 2 is a block diagram that illustrates a system for generating a schema in accordance with an aspect of the present invention.

Turning now to FIG. 2, a computer-based system 200 for generating a schema 150 is illustrated with a contactor 210 and a contactee 220. Thus, the data receiver 110 receives the relevant data 120 from one or more contactors 210 and one or more contactees 220. The contactors 210 and the contactees 220 can include, but are not limited to, human entities and computer components. By way of illustration, a person A for whom a communication will be managed by a system that employs the schema 150 can have preferences and context data 120 and/or other data, and thus the data receiver 110 can receive preferences and context concerning person A. By way of further illustration, an automated dialing process B for whom communications will be managed by the system that employs the schema 150 can have preferences and context and/or other data 120 and thus the data receiver 110 can receive preferences and context concerning the automated dialing process B. While one contactor 210 and one contactee 220 are illustrated, it is to be appreciated that a greater number of communicating parties can have relevant data 120 that are processed by the schema generator 140 and stored in the schema 150.

Figure 3:
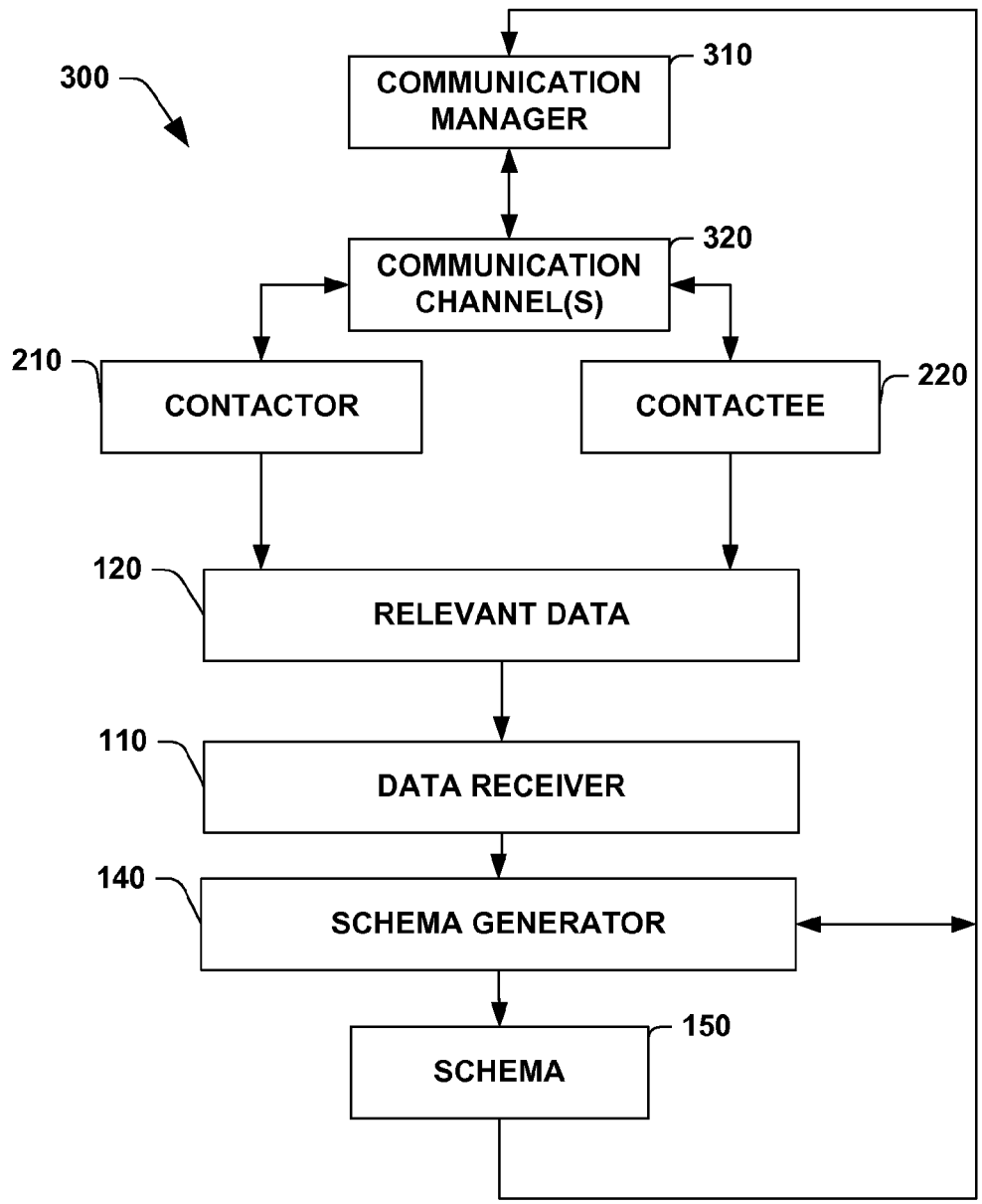
FIG. 3 is a block diagram that illustrates a system for generating a schema and employing that schema in communication channel selection and management, in accordance with an aspect of the present invention.

Turning now to FIG. 3, a computer-based system 300 for generating and accessing a schema 150 is illustrated. The system 300 includes a communication manager 310 that selects one or more communication channels 320 that will optimize utility of a communication between a contactor 210 and a contactee 220 based, at least in part, on information retrieved from a schema 150. In one example of the present invention, the communication manager 310 feeds back communication channel selection information to the schema generator 140, which can in turn update the schema 150 based on the communication channel selection.

The schema 150 can store information concerning the communication channels 320. A communication can be implemented over a variety of channels 320 including, but not limited to, telephone channels, computer channels, fax channels, paging channels and personal channels, for example. The telephone channels can include, but are not limited to POTS (plain old telephone system) telephony, cellular telephony, satellite telephony and Internet telephony channels. The computer channels can include, but are not limited to email, collaborative editing, instant messaging, network meetings, calendaring and devices employed in home processing and/or networking. The personal channels can include, but are not limited to videoconferencing, messengering and face-to-face meeting. Thus, one example of the present invention facilitates receiving information concerning such communication channels 320 and generating a schema 150 that stores such communication channel data, where the schema 150 facilitates employing such stored data in utility optimizing channel management decisions. One manner in which the schema 150 can store information concerning such a variety of communication channels is by defining XML elements that can be stored in an XML file. Thus, the schema generator 140 can parse the communication channel data for information to populate instances of such defined elements and attributes.

In accordance with one specific implementation of the subject invention, while reviewing a document in a shared authoring setting, an individual or entity can identify certain subset(s) of the document (e.g., highlight particular text) and the subject invention invokes a service that provides for communication via the communications schema rich information relating to the subset(s). The schema can include for example, information about channel(s) of delivery, receiving device (e.g., desktop computer), software type, document pointer, text pointer and/or the text itself that is the focus of the communications. It is to be appreciated that a variety of software applications (e.g., word processing programs, database programs, messenger programs, graphics programs, application development programs, browsers, business programs . . . ) can employ such aspect of the subject invention. Moreover, it is to be appreciated that such aspect can be incorporated into the software upon development or become operative in conjunction therewith (e.g., plug-in, standalone application, background application, foreground application . . . ).

Concerning utility of a communication that can be managed by the communication manager 310, the value of a current potential communication can be evaluated by considering a measure of the history of utility of communication, attributes of the communication that can be stored as metadata (e.g., intended focus of communication, nature of communication channel, reliability of communication channel), and/or combinations thereof. Such an expected utility can be computed through the use of probabilistic models such as Bayesian networks and decision trees that provide probability distributions over outcomes based on observations or attributes associated with the communication, setting, and so on. Coupling probabilistic inference models with preferences, and employing the principles of maximum expected utility for optimization provides a useful method for computing the value of different communication actions. In one example of the present invention, utility represents communication effectiveness correlated to adherence to user preferences. Such effectiveness can be measured by factors including, but not limited to, reliability achieved on the communication channel, quantity of information content transferred, quality of information content transferred, and relevancy of information content transferred.

An expected utility function takes into consideration probability distributions over future outcomes and user preferences while reasoning under uncertainty. An example expected utility function can be calculated using:

$$E[u(d_i,c)] = s_j \epsilon s \Sigma u(s_j, d_i) p(s_j | d_i, c),$$

where $p(s_j|d_i,c)$ represents the probability of achieving a future state $s_j$ given a decision $d_i$ concerning situation c, capturing communication channel parameters, nature of the contactor and a context for the contactee. Each individual outcome state $s_j \epsilon s$ represents a possible match of preferences and/or other data to related communication parameters. The function $u(s_j, d_i)$ represents the utility of state $s_j$ after the decision $d_i$ has been made.

Assume that the present invention considers two possible utilities, $U_{high}$ and $U_{low}$. Based on selecting particular communication parameters (e.g., time, media, location), the system 10 can compute $P_{high}$ and $P_{low}$, the probabilities of achieving $U_{high}$ and $U_{low}$, where $P_{high}=1-P_{low}$. Although two utility states are identified, it is to be appreciated that a greater number of utility states can be employed with the present invention. The expected utility of a decision $d_i$ is then:

$$E(d_i) = P_{high} U_{high} + P_{low} U_{low}.$$

After computing the $d_i \epsilon D$, the system 10 can select the decision d* where d*=arg max $d_i \epsilon D\ E[u(d_i,c_j)]$, where d* represents the decision associated with maximum expected utility E.

A high utility can be associated with, for example, a large amount of valuable information being transferred. A low utility can be associated with, for example, a small amount of valuable information being transferred. Similarly, a low cost can be associated with a low drain on the attentional resources of the contactee, as might be captured by a low interruptability factor (e.g., user does not have to leave important meeting or shut down an application) and with a low amount of "hanging" (e.g., the number, type and/or importance of people and/or resources left waiting for the return of the attentional resource of the user). A high cost can be associated with a significant drain on the attentional resources of the contactee, as might be associated with an action of high interruptability (e.g., pulling a person from an important meeting) leaving many important people waiting. The utilities can take into consideration both the value and the disruptiveness of communication outcomes, combining the costs and benefits in a single assessment or explicitly breaking out the cost and benefits of the communication, and providing a means for coupling the two together (e.g., employing an additive multi-linear model, summing costs and benefits after selective weighting of the separate factors).

The utility of the communication can be evaluated according to formulae that consider the cost of the communication and the value of the communication as viewed from the points of view of both a sender and a receiver. An exemplary formula can take the form:

$$\text{utility}=u(\text{cost}_S,\text{value}_S,\text{cost}_R,\text{value}_R),$$

The utility calculations may weight the costs and/or benefits to the contactors and/or contactees differently. By way of illustration, the value can be computed via a combination function f of other functions g and h that operate separately on the costs and the benefits to the contactor (the sender) and the contactee (recipient of the initial communication) as follows:

$$\text{utility}=f(g[(\text{value}_S*w1),(\text{cost}_S*w3)],h[(\text{value}_R*w2),(\text{cost}_R*w4)]).$$

By way of further illustration, consider a case where the value is a function of the difference of the costs and the benefits to the contactor and the contactee, as follows:

$$\text{utility}=f([(\text{value}_S*w1)-(\text{cost}_S*w3)],[(\text{value}_R*w2)-(\text{cost}_R*w4)]).$$

One example of such a difference function employs a multi-linear weighted combination of the separate terms for contactee and contactor, $$\text{utility}=w_S[(\text{value}_S*w1)-(\text{cost}_S*w3)]+w_R[(\text{value}_R*w2)-(\text{cost}_R*w4)]).$$

For such a formulation, diminishing $w_S$ to zero, removes the preferences of the contactor, and makes communication decisions depend on the preferences of the contactee. Diminishing $w_R$ to zero, makes communication decisions depend on the preferences or other considerations of the contactor. Such adjustments to the weights, which can lead to diminutions and/or enhancements of the relative importance of the contactor and/or contactee costs and/or benefits. Similarly, weights can be affected by context (e.g., time, location, activity).

The cost to the sender ($\text{cost}_S$) can be analyzed by examining a set of cost factors $\text{cost}_S=\{a, b, c, \ldots\}$ that can include, but are not limited to, the cost of making a connection instantly, the cost of making a connection at a later time, the cost of employing a particular channel and/or set of channels and the cost of not making a connection, where the costs may include actual costs and/or expected costs. Such costs can be measured by actual and/or opportunity cost in time, communication resources and/or human resources.

The value to the sender ($\text{value}_S$) can also be analyzed by examining a set of value factors $\text{value}_S=\{m, n, o, \ldots\}$ that can include, but are not limited to, the value of making an instant connection, the value of making a later connection and the value of employing a particular channel and/or set of channels, where the values can include actual values and/or expected values. The values can similarly be measured by actual and/or opportunity cost of time, communication resources, dollars, and/or human resources. The expected costs and/or expected values can be computed through deterministic processing and/or reasoning under uncertainty.

The cost to the receiver ($\text{cost}_R$) can be analyzed by examining a set of cost factors $\text{cost}_R=\{x, y, z, \ldots\}$ that can include, but are not limited to, the cost of making a connection instantly, the cost of making a connection at a later time, the cost of employing a particular channel and/or set of channels and the cost of not making a connection, where the costs can include actual costs and/or expected costs. Such costs and/or values can be measured by actual cost in time, money, human resources, and/or opportunity cost in time, money, human resources and/or communication resources, for example.

The value to the receiver ($\text{value}_R$) can also be analyzed by examining a set of value factors $\text{value}_R=\{p, q, r, \ldots\}$ that can include, but are not limited to, the value of making an instant connection, the value of making a later connection and the value of employing a particular channel and/or set of channels, where the values can include actual values and/or expected values. The expected costs and/or expected values can be computed through reasoning under uncertainty. The costs can vary over time, thus, a first set of costs $\text{cost}_S T_0$ computed for a first time $T_0$ may not be equal to a second set of costs $\text{cost}_S T_1$ computed for a second time $T_1$. Similarly, the values can vary over time and a first set of values $\text{value}_S T_0$ may not be equal to a second set of values $\text{value}_S T_1$. Thus, rather than producing a single value, the systems described thus far and described in more detail below can produce a set of expected utilities for the communications via a plurality of communication channels.

Utility optimization in connection with the subject invention can be based at least in part on a variety of other factors such as for example: (1) whether two or more communicating parties are concurrently engaged in a related activity; (2) whether two or more communicating parties are likely to become concurrently engaged in a related activity; (3) whether two or more communicating parties are concurrently engaged in a similar activity; (4) whether two or more communicating parties are likely to become concurrently engaged in a similar activity; (5) whether two or more communicating parties are concurrently processing one or more related documents; (6) whether two or more communicating parties are likely to concurrently process one or more related documents; (7) whether two or more communicating parties are concurrently viewing one or more related documents; (8) whether two or more communicating parties are likely to concurrently view one or more related documents; (9) whether two or more communicating parties are concurrently engaged in a shared project; (10) whether two or more communicating parties are likely to become concurrently engaged in a shared project; (11) whether two or more communicating parties are scheduled to communicate within a pre-defined period of time; (12) whether two or more communicating parties have communicated within a pre-defined period of time; (13) whether two or more communicating parties are scheduled to meet within a pre-defined period of time; (14) whether two or more communicating parties have met within a pre-defined period of time; (15) whether a communicating party has engaged in one or more pre-defined activities of interest within a pre-defined period of time; (16) whether a communicating party is likely to engage in one or more pre-defined activities of interest within a pre-defined period of time; (17) whether a communicating party has purchased one or more pre-defined items of interest; (18) whether a communicating party has registered an interest in one or more pre-defined items of interest; (19) the degree to which a communicating party is trusted by one or more other communicating parties.

It is to be appreciated that the aforementioned list of factors that can be employed in connection with the subject invention can be considered individually or a subset of the factors considered concurrently. Moreover, it is understood that the above list is merely exemplary and should not be considered exhaustive of the variety of factors that could be considered in connection with facilitating utility optimization in connection with the subject invention. Thus, one example of the present invention facilitates storing multiple sets of values and costs for various points in time in the schema 150.

Figure 4:
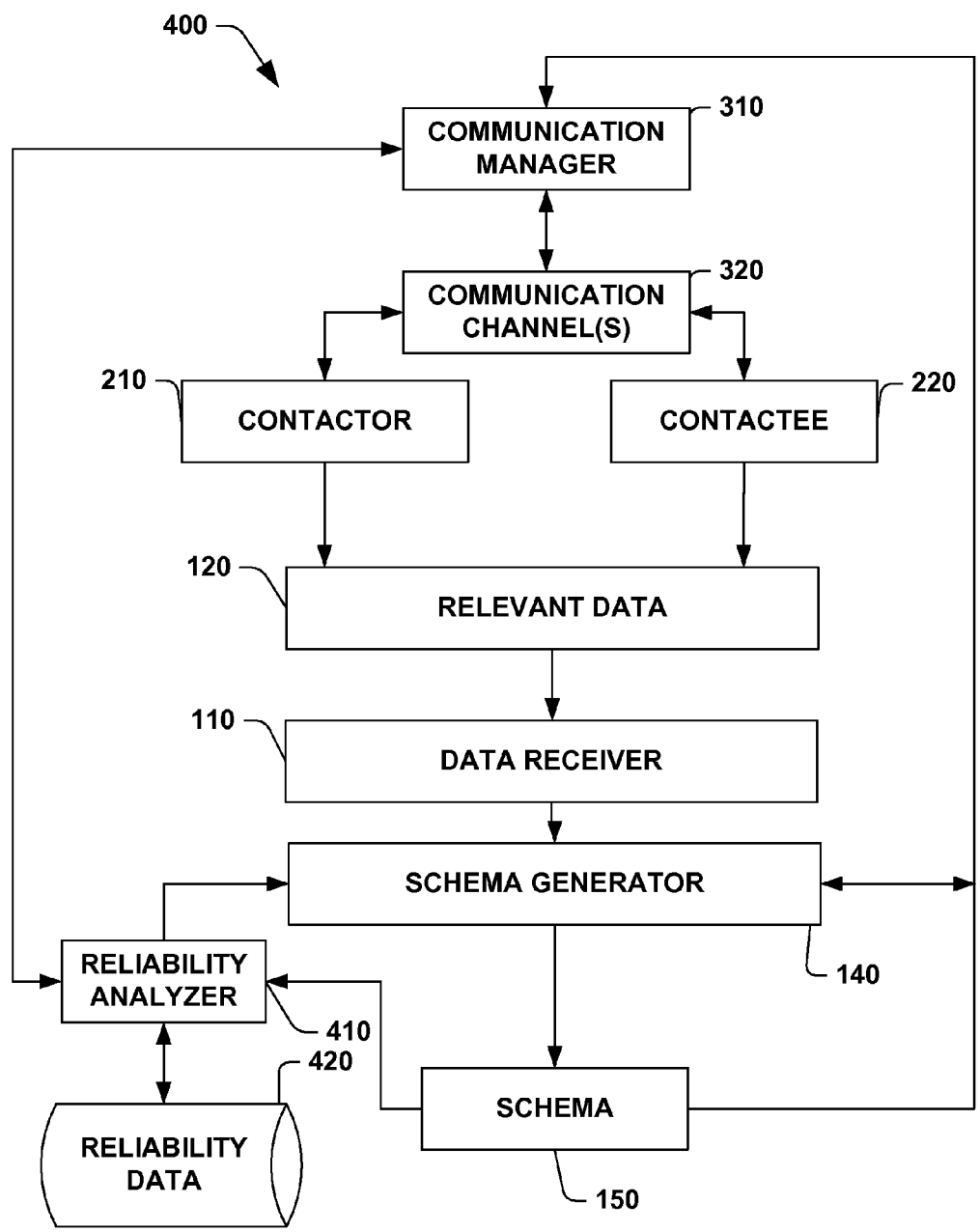
FIG. 4 is a block diagram that illustrates a system for generating a schema and employing that schema in communication channel selection and management that considers channel reliability, in accordance with an aspect of the present invention.

Turning now to FIG. 4, a computer-based system 400 that employs a schema 150 and a communication manager 310 that considers the reliability of a communication channel 320 when selecting a communication channel 320 to optimize utility of a managed communication is illustrated. The system 400 includes a reliability analyzer 410 that processes reliability data 420 and employs the schema generator 140 to store such data for subsequent utility optimizing processing. Thus, the communication manager 310 can accept a reliability input that includes reliability data stored in the schema 150. The reliability analyzer 410 and the communication manager 310 thus access the schema 150 when determining which, if any, communication channels 320 to employ for a communication. Accessing the schema 150 can include generating a query that extracts stored data (using, for example XPath), parsing the schema data and reading subsets of the schema data, for example.

The reliability data 420 can include, but is not limited to, the likelihood that a communication will be degraded (e.g., portion of a communication dropped, garbled), the likelihood that a communication will be disconnected, and the likelihood that a communication will be compromised (e.g., intercepted, decrypted, altered). The reliability data 420 can include the likelihoods at the time of the communication and at other available times. Reliability data 420 can also include mean time between failure of a communication channel 320, average failure duration on a communication channel 320, average percent degradation of a communication channel 320, atmospheric conditions, scheduled communication channel 320 maintenance and scheduled communication channel 320 downtime. Thus, the schema 150 can include an element declaration like:

<!ELEMENT reliability (degrade, disconnect, compromise)>

Factors that the reliability analyzer 410 and/or the communication manager 310 consider when determining whether a communication will be degraded include, but are not limited to, the expected duration of the communication, the desired communication channel(s) 320, the reliability history of the desired communication channel(s), the cost(s) associated with a lost connection, the cost(s) associated with reconnecting, the attentional status and activity of a communicating party, and the utility of a partially completed communication. Therefore, data and/or inferences concerning the data associated with such factors can be stored by the schema 150 generated by the schema generator 140. Thus, the schema 150 can include an element declaration like:

<!ELEMENT costs(lost_connect, reconnect)>

Reliability data 420 can also include cost(s) associated with a lost connection, where such costs can vary depending on the identity of the parties, the subject matter of the communication and the context of the parties. By way of illustration, the cost of losing a casual conversation between friends may be lower than the cost of losing a last-second communication between a trader and a stockholder. The costs associated with a lost connection include, but are not limited to, frustration factors, monetary costs, opportunity costs, time delay costs and embarrassment costs. The costs also include the cost(s) associated with reconnecting a lost communication, where such costs vary depending on the identity of the parties, the subject matter of the communication and the context of the parties. The costs associated with reconnecting include, but are not limited to, monetary costs, time delay costs, resource consumption costs, frustration costs and embarrassment costs (e.g., having a company appear incompetent or technologically challenged). Thus, the schema 150 can include an element declaration like:

<!ELEMENT costs(dollar, time, resources, frustration, embarrassment)>

Reliability data 420 can also include data concerning the utility of a partially completed communication. For example, the goal of a first communication may be to relate a lengthy piece of highly important data between two parties where the data has no value unless it is transmitted one hundred percent intact. The utility of partially completing such a first communication is low. But the goal of a second communication may be to relate a list of small, independent pieces of relatively unimportant data between two parties where each small piece of data has independent value. Thus, one example of the present invention facilitates generating a schema 150 that stores reliability data and/or inferences concerning reliability data. One example of the present invention also facilitates generating a schema 150 that can be accessed by a communication manager 310 to facilitate employing reliability data and/or inferences in utility optimizing channel management decisions. Thus, the schema 150 can include an element declaration like:

<!ELEMENT utility(partial,full)>

The reliability data 420 holds information not only about a communication channel 320 but also about a communication. Communication data includes, but is not limited to, reliability history of a current communication, communication length and communication type. The reliability history of a communication can include data concerning whether the ongoing communication has been degraded and if so, in what degree and what percent of the communication has been degraded. The communication length can include both the actual length of an ongoing communication and predictions concerning the anticipated length of a communication. Similarly, the communication type can contain information concerning the actual communication type and predictions concerning related communications. Therefore, one example of the present invention facilitates generating a schema 150 that stores such communication data and/or inferences concerning the communication data. The schema 150 facilitates employing such stored data in utility optimizing channel management decisions. Thus, the schema 150 can include element declarations like:

<!ELEMENT communication (reliability, length, type)>
    <!ELEMENT reliability (degraded, severity)>
    <!ELEMENT degraded (YES|NO)>
    <!ELEMENT length (actual, predicted)>
    <!ELEMENT type (actual, predicted)>

Figure 5:
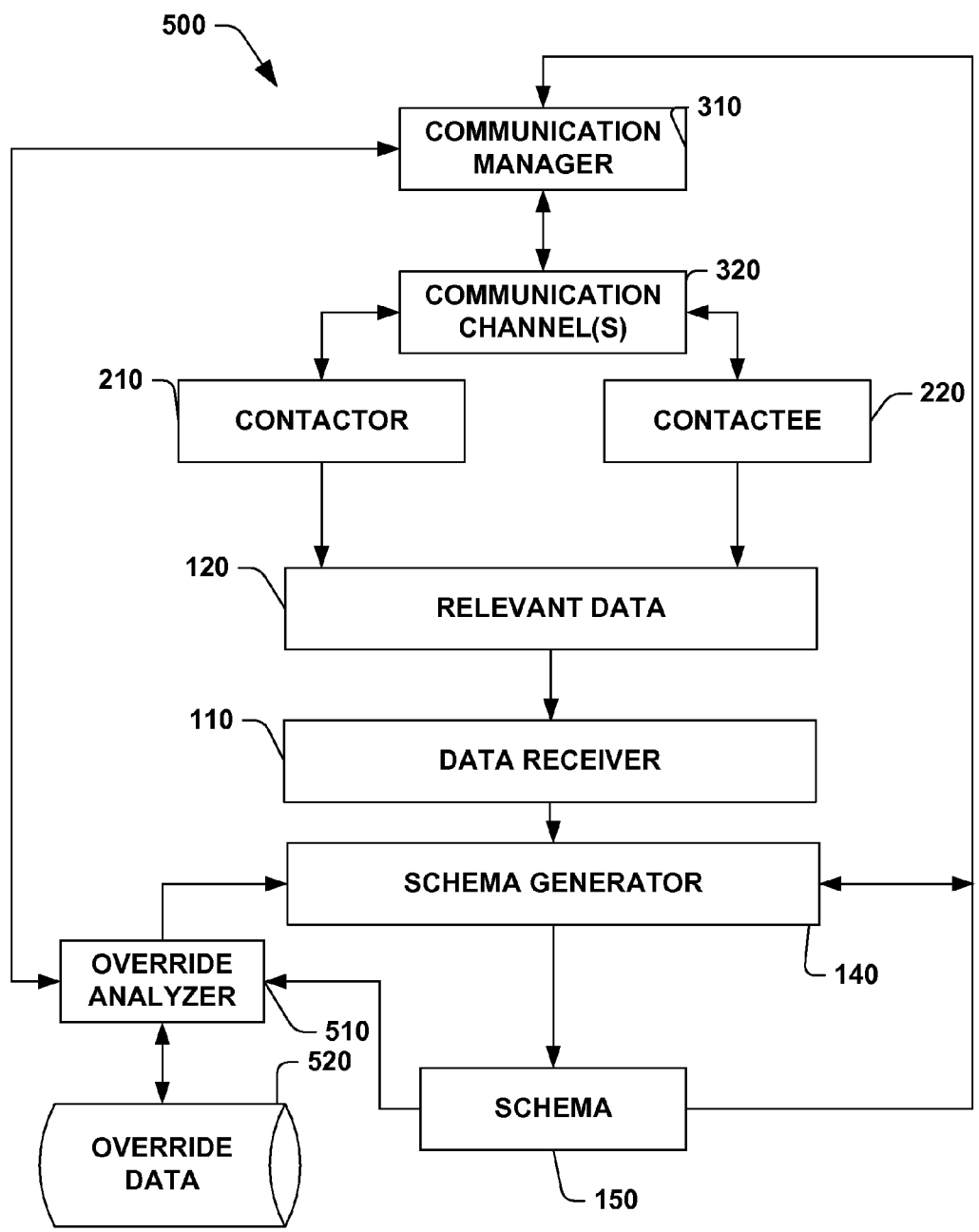
FIG. 5 is a block diagram that illustrates a system for generating a schema and employing that schema in communication channel selection and management that considers override decisions, in accordance with an aspect of the present invention.

FIG. 5 illustrates a computer-based system 500 that includes an override analyzer 510 for including override analysis in communication utility optimizing. The override analyzer 510 process override data 520 and makes it accessible to the schema generator 140 so that data and/or inferences associated with override processing can be stored in the schema 150. The communication manager 310 therefore can accept an override input that conveys override information. The schema 150 can, therefore, include element declarations for override related data.

Figure 6:
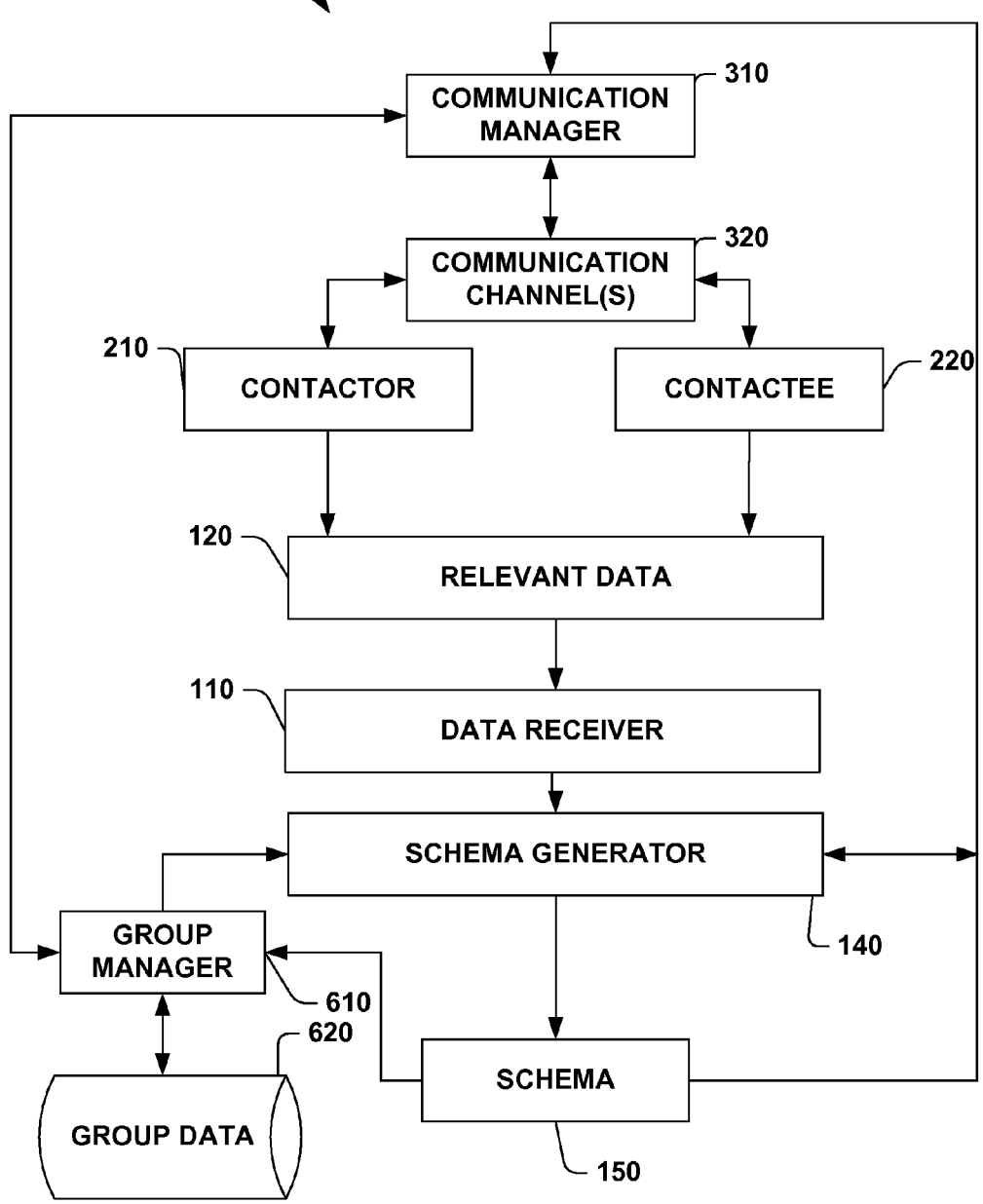
FIG. 6 is a block diagram that illustrates a system for generating a schema and employing that schema in communication channel selection and management that considers group membership, in accordance with an aspect of the present invention.

FIG. 6 illustrates a computer-based system 600 that employs the schema 150 to facilitate group processing by the communication manager 310 and/or group manager 610. The system 600 includes a group manager 610 that processes group data 620. Group data 620 includes, but is not limited to, group identity data, group preference data and group context data. The group identity data can include, but is not limited to, the name of a group, the membership of a group (where the membership can be stored in one or more data structures including, but not limited to, a list, a linked list, an array, a table, a database, a datacube, and the like), group classification data and group inclusion criteria. Group classification data can be, for example, information concerning how the group was formed, when the group was formed, additions/deletions/updates performed for the group, and group creator metadata. The group inclusion criteria can be, for example, information concerning traits that make a communicating party eligible for membership in the group. Such traits can include, but are not limited to, communicating party membership in an address book, the time since the communicating party last communicated, the time left until a deadline with which the communicating party must comply, the presence and/or location of the communicating party in a collection (e.g., organization chart, family tree, team roster), the degree to which a communicating party is trusted (e.g., nuclear family member vs. known spammer), and who is attempting to initiate the communication. The group identity data can include, but is not limited to, the identity of a communicating party group member (e.g., name, classification, group memberships), preferences associated with the communicating party group member (e.g., hardware, software, time, date, location), and context data (e.g., hardware, software, observed). Thus, the present invention facilitates generating a schema 150 that stores such group data and/or inferences concerning such group data where such schema 150 can include element declarations like:

<!ELEMENT group_data(identity, preference, context)>
    <!ELEMENT identity (name, membership, classification, inclusion)>
    <!ELEMENT classification (how_formed, when_formed, add, del, upd, creator)>
    <!ELEMENT inclusion (address_books, time_since, deadline, trust)>

Furthermore, the schema 150 facilitates employing the stored data and/or inferences in communication management decisions that facilitate optimizing communication utility.

Figure 7:
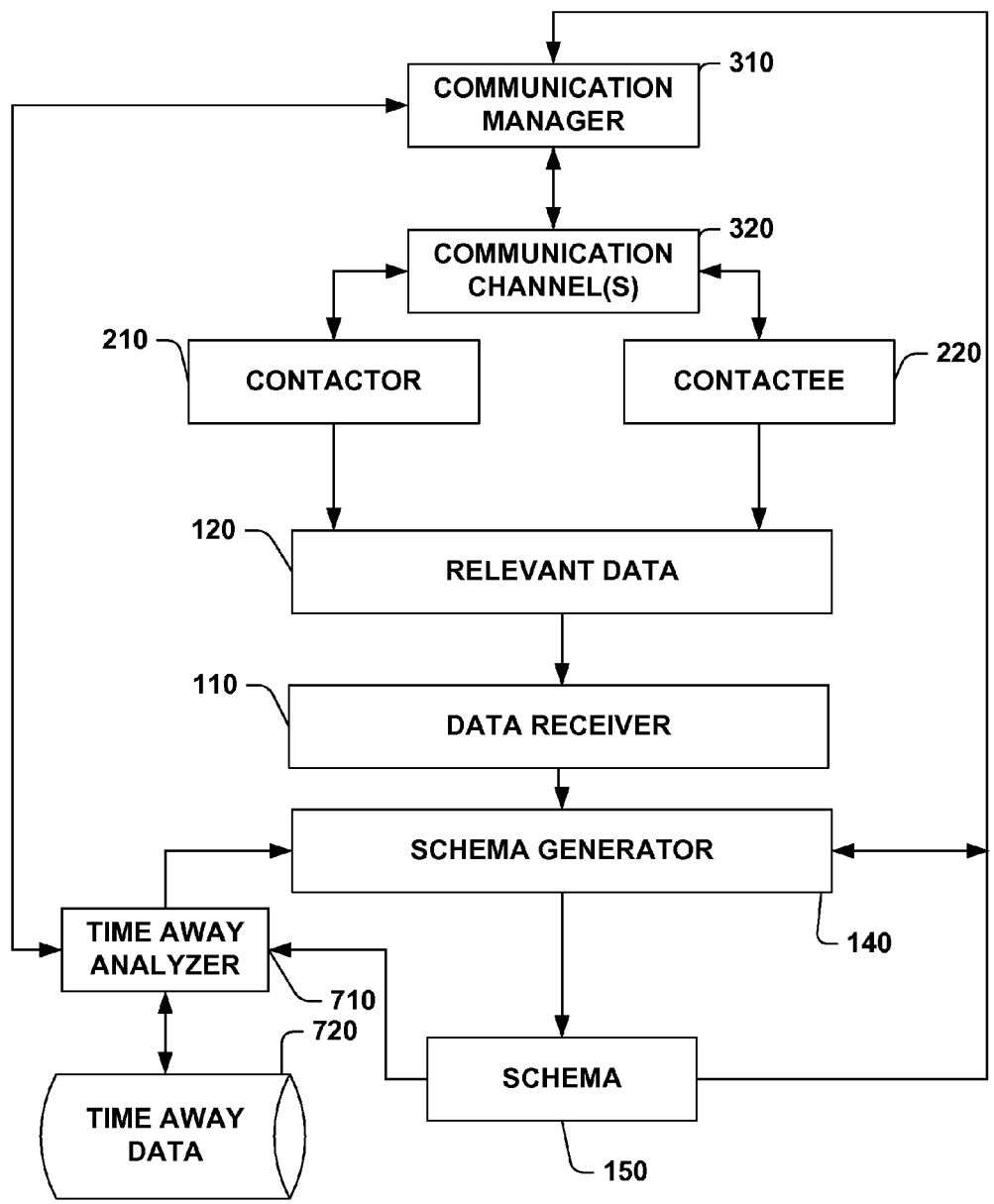
FIG. 7 is a block diagram that illustrates a system for generating a schema and employing that schema in communication channel selection and management that considers time away analysis, in accordance with an aspect of the present invention.

Another application that can be supported by the schema 150 is time away processing. Thus, FIG. 7 illustrates a computer-based system 700 that includes a time away analyzer 710 that processes a time away data 720. The schema 150 can store data and/or inferences about the time away data 720. Therefore, the communication manager 310 can make utility optimizing decisions concerning the communication channel(s) 320 to employ for a communication based, at least in part, on such time away information stored in the schema 150. The schema 150 can, therefore, include element declarations that capture the time away data. Such time away data can include, but is not limited to, a current time away from a task data, a current time away from a computer component data, a current time away from a contextual data item state, a historical time away from a task data, a historical time away from a computer component data, a historical time away from a contextual data item state, information associated with the likelihood that a person will return to a task, information associated with the likelihood that a person will return to a computer component, calendar information, and information associated with the likelihood that a person will return to a contextual data item state.

It is to be appreciated that the systems 100, 200, 300, 400, 500, 600 and 700 can be implemented as one or more computer components, as that term is defined herein. It is to be further appreciated that computer executable components operable to implement the systems 100-700 can be stored on computer readable media including, but not limited to, an ASIC (application specific integrated circuit), CD (compact disc), DVD (digital video disk), memory, read only memory (ROM), random access memory (RAM), programmable ROM (PROM), floppy disk, hard disk, EEPROM (electrically erasable programmable read only memory), carrier wave, and memory stick.

In view of the exemplary systems shown and described above, methodologies that are implemented in accordance with the present invention will be better appreciated with reference to the flow diagrams of FIGS. 8, 9, 15 and 17. While for purposes of simplicity of explanation, the illustrated methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement a methodology in accordance with the present invention. Furthermore, additional and/or alternative methodologies can employ additional blocks, not illustrated herein. In one example of the present invention, such methodologies can be implemented as computer executable instructions and/or operations, which instructions and/or operations can be stored on computer readable media including, but not limited to an ASIC, a CD, a DVD, a RAM, a ROM, a PROM, an EEPROM, a disk, a carrier wave, and a memory stick.

Figure 8:
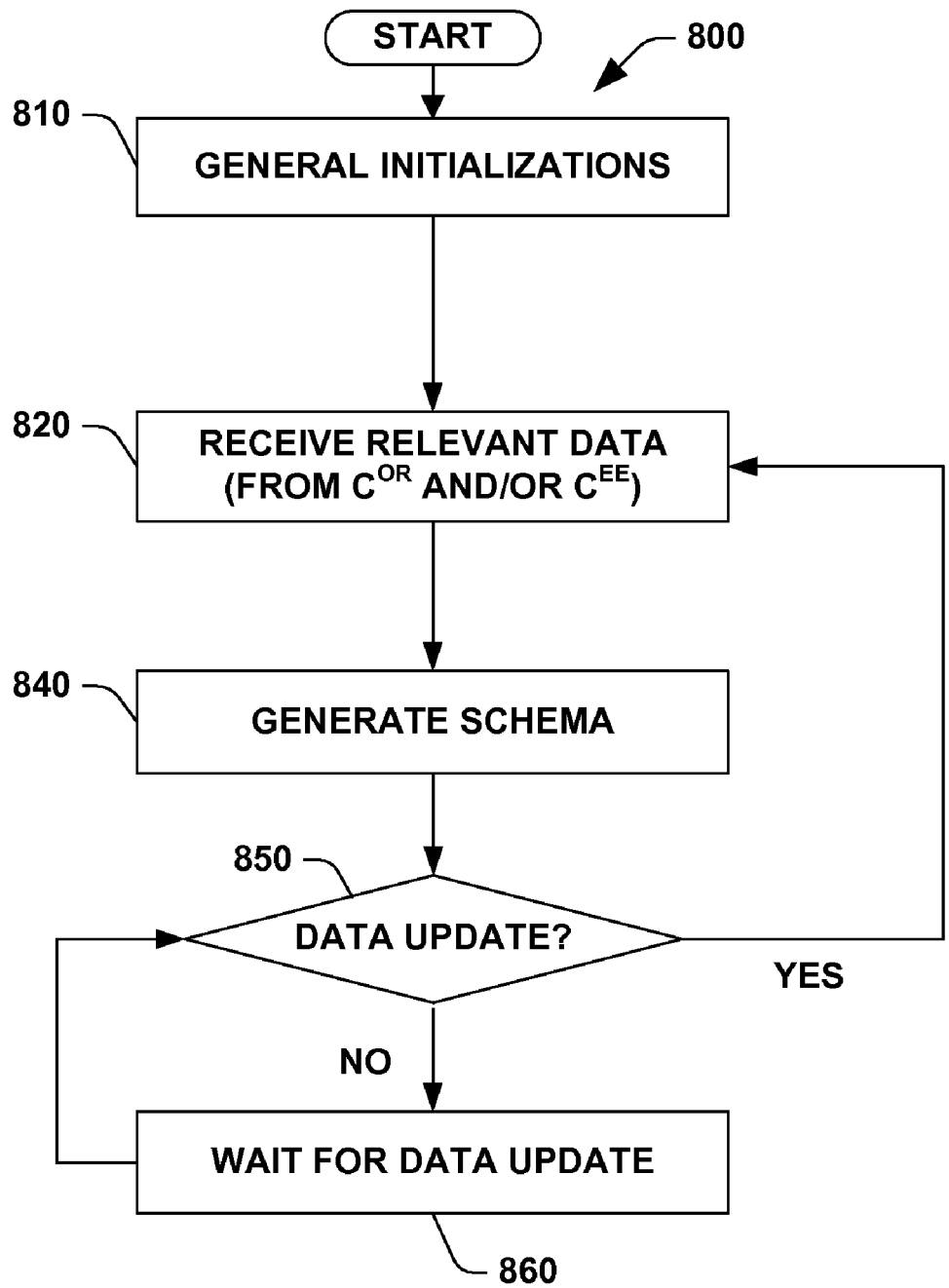
FIG. 8 is a flow chart that illustrates a method for generating a schema, in accordance with an aspect of the present invention.

FIG. 8 is a flow chart that illustrates a computer-based method 800 for generating a schema that facilitates utility optimizing communication management. At 810, general initializations occur. Such initializations can include, but are not limited to, allocating memory, establishing pointers, establishing data communications, acquiring resources, setting variables and displaying process activity. At 820, metadata is received from contactors and/or contactees, both human and computer components. The data can include, but is not limited to, (a) the identity of the contacting party, (b) the relationship of the contactor to the contactee, (c) dynamically determined memberships of the contactor in groups by activities, such as whether the contactee is involved with an active collaborative project or will be in a meeting within some time horizon from the present time, (d) a preferred communication time, (e) a preferred communication day, (f) a preferred communication party or parties, (g) cost associated with having different subsets of parties included, (h) preferred hardware devices for different participating parties (i) preferred set of software components, (j) preferred communication modality or channel for one or more of the parties, (k) estimated amount of time required for the communication, (l) other resources required at the time of the communication to make the communication most effective, (m) initial channel employed in the contact, (p) information about goals or intentions of the communication, (q) content or pointers to content of information on the focus of attention or some other aspect of information that will facilitate the communication, (r)

functions and/or parameters indicating cost of delay with time until the communication, including deadline information as to the time that the communication will likely be worthless, (s) functions and/or parameters indicating cost of using different communication channels or modalities, and (t) participants locations.

The data can also include functions and/or parameters indicating cost of communicating at different times based on a consideration of context over time, including at least one of: (1) information about interruptability of one or more participants over time, (2) information about the calendar or upcoming appointment structure of one or more participants, and (3) information about a best communication policy and a preferred interruptability.

Thus, the metadata encodes information related to how communicating parties would like to carry on a communication. Therefore, a schema from which such preference data could be received can include element declarations like:

<!ELEMENT preference (time, day, party, hardware, software, policy, interrupt)>
    <!ELEMENT hardware (name, capacity, cost)>
    <!ELEMENT software (name, capacity, cost)>

At 830, the method receives context data from contactors and/or contactees, human and/or computer components. The context data can include, but is not limited to, an activity type, a location, a calendar, a communication history, an ambient noise, a time on task, a gaze track data, a communication needs data, and an attentional status data. Thus the context data stores information about the communicating parties. Thus, a schema from which such context data could be received can include element declarations like:

<!ELEMENT context (activity, location, noise, gaze, needs)>
    <!ELEMENT activity (name, actual_duration, historical_duration)>

At 840, the method generates a schema that facilitates employing the preference data and the context data in utility optimizing managed communication decisions. In one example of the present invention, the schema is an XML schema. Thus, at 840, the method identifies elements and/or attributes that capture the information available from the preferences and/or context and populates an XML file with values for the elements and attributes. Such populating can be performed by parsing the available data and instantiating instances of declared elements with the available values. Since different utility optimizing decision makers (e.g., channel managers) can have different equations, algorithms, and processes, and thus can have different data needs, the schema that is generated at 840 can be tailored to a specific channel manager and/or can be made generic to facilitate operating with a variety of channel managers. In one example of the present invention, the schema is stored in a binary large object.

The preferences received at 820 and/or the context received at 830 can include deterministic data. However, some pieces of data that may be desired for the schema may be missing. Thus, at 840, reasoning under uncertainty can be undertaken to generate inferences concerning missing data values. Furthermore, at 840, probabilities and/or probability distributions associated with the preferences, context and/or inferences can be generated. Thus, the schema generated at 840 can store inferences concerning missing pieces of at least one of, the context data and the preference data and can store probabilities and probability distributions associated with utility optimizing decisions.

The reasoning under uncertainty that occurs at 840 can involve Bayesian techniques that generate and/or process one or more Bayesian networks. Thus, the schema generated at 840 can also store one or more Bayesian networks that facilitate making a utility optimizing decision concerning the managed communication. For example, a utility optimizing decision can consider the preferences and context of communicating parties to determine which channel(s) should be employed for the communication, at what time the communication should occur and among which parties the communication should occur. Such a decision can involve the conditional probability of a first item based on evidence concerning a set of second items. A sample conditional probability calculation that can be employed by a channel manager is:

$p(A \uparrow B,C)$ represents the probability of A given B (e.g., preferences) and C (e.g., context). Thus, the schema generated at 840 can store the data upon which the conditional probability is predicated (e.g., B, C) and/or the conditional probability generated concerning A, and can, therefore, include an element like:

<!ELEMENT conditional_probability (probability A, B, C)>

Preferences and context are not static items. Such preferences and context can vary over time. Thus, the schema generated by method 800 can be a dynamic item that is responsive to changing preferences and context. Therefore, at 850, in one example of the present invention, a determination is made concerning whether a data update is available. Such a determination can be made, for example, by examining a difference table to determine whether new data changes have been reported and/or noted. If the determination at 850 is YES, then processing returns to 820 where the updated data is received. If the determination at 850 is NO, then the method 800 waits for an update. Such waiting can be performed by techniques including, but not limited to, sleep/wakeup processing, timed interval determinations, interrupt processing, and the like.

Figure 9:
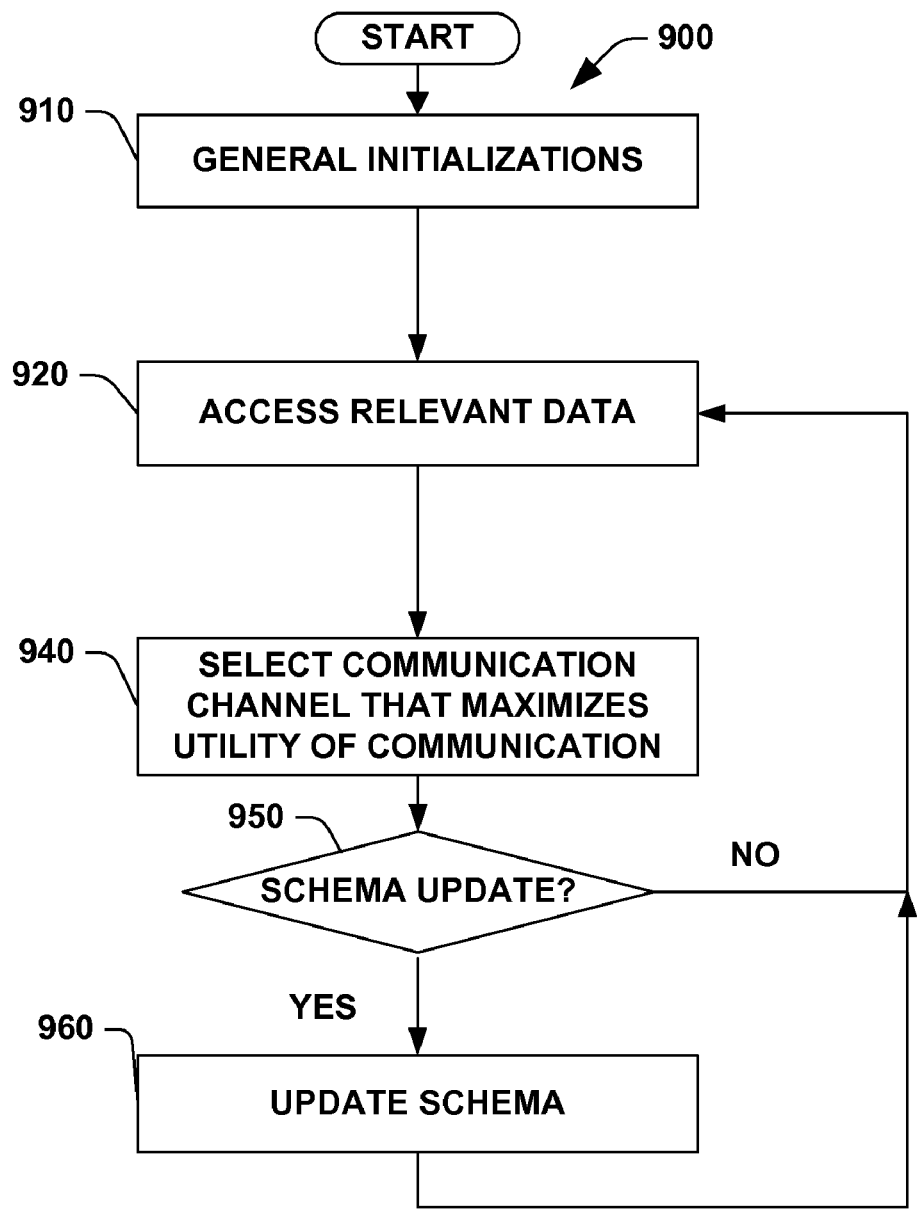
FIG. 9 is a flow chart that illustrates a method for employing a schema in communication management, in accordance with an aspect of the present invention.

Turning now to FIG. 9, a computer-implemented method 900 that accesses a schema (e.g., a schema generated through method 800) to facilitate optimizing utility of a communication is flow-charted. At 910, general initializations occur. Such initializations can include, but are not limited to, identifying a schema to access, acquiring a schema definition, locating a DTD (document type declaration) allocating memory, establishing pointers, establishing data communications, acquiring resources, setting variables and displaying process activity.

At 920, a schema is accessed, for example, by a communication manager. Accessing the schema can include, but is not limited to, reading a file, reading an XML file, receiving the results of a database query and extracting element values and/or attribute values from an XML file stored in a binary large object. While the discussion associated with FIG. 9 primarily concerns a communication manager, it is to be appreciated that a schema generated and/or managed by the present invention can be accessed by other applications. At 920, the schema is accessed and data including, but not limited to, a preference of a communicating party, a context of a communicating party, an inference concerning a preference of a communicating party, and an inference concerning a context of a communicating party can be retrieved. For example, values that populate instances of elements like those described above can be retrieved from one or more XML files. The data can then be employed to determine a communication time, channel and group to facilitate optimizing utility of a communication. For example, a utility calculation like that described above can be made based, at least in part, on the data retrieved at 920.

At 930, communication channel data is received. Such data can be retrieved from the same schema as the data accessed at 920, from a different schema, or from a different source. For example, a first schema can store preference, context and channel data, or a second schema can store preference and context while a third schema stores channel data and a fourth schema stores preference and context while channel data is stored in a non-schema entity (e.g., retrieved in real-time from devices and reported directly to method 900). While three example storage combinations of preference, context and channel data are described, it is to be appreciated that a greater and/or lesser number of such combinations can be employed with the present invention. As described above, communication channel data can include, but is not limited to, channel identity, channel capacity, channel availability, channel cost, and the like. Thus, data retrieved from an XML file that includes an element declaration like:

<!ELEMENT channel_data (identity, capacity, availability, cost)> could be, for example, cellphone1, 1 Mbps, 75%, 0.03. These values could represent, for example, the name of a cellular telephone, its data transfer rate, the likelihood that it is available and the cost per minute of use. This data can be employed to determine a communication time, channel and group to facilitate optimizing utility of a communication.

At 940, a communication channel that optimizes utility of the communication is selected based, at least in part, on the preference, the context, the inferences concerning the preference, the inferences concerning the context, and/or the communication channel data. For example, a utility calculation like:

$$\text{utility}=u(\text{cost}_S,\text{value}_S,\text{cost}_R,\text{value}_R),$$

can be made on the data received at 920 and/or 930. The $\text{cost}_S$ can be determined, in one example of the present invention, by considering data that includes both hardware and software data. For example, the hardware data can include, but is not limited to, information related to what hardware is available for a communication, what hardware is being employed (e.g., desktop, laptop, PDA), capabilities of that hardware (e.g., memory, communication bandwidth), the cost of employing the hardware and the state(s) in which the hardware is currently functioning (e.g., online, offline). The hardware data can also include information concerning usage patterns that facilitate determining the likelihood that an unavailable piece of hardware will become available. The hardware data may be incomplete, thus, inferences concerning the value of hardware data point can be made (e.g., via Bayesian processing) or may have been made with the inferences being retrieved from the schema. The present invention facilitates generating, managing and/or accessing a schema that stores such hardware data and/or inferences concerning such data. Furthermore, the schema facilitates accessing the stored data and/or inferences by systems and/or methods that perform utility optimizing channel management by providing an extensible, portable data tailored to managed communication.

The $\text{cost}_S$ can also be figured by examining software data that includes information related to software that is available for a communication, software that is currently being employed by potential communicating parties (e.g., word processor), the capabilities of that software (e.g., allows collaborative editing) and the state(s) in which that software is currently functioning (e.g., running and active, running but inactive). Software data can also include information concerning usage patterns that facilitate determining the likelihood that an unavailable piece of software will become available. By way of illustration, historical data may be available that indicates that the average word processing session undertaken by a user is one hour. Furthermore, context data may be available that indicates that the current session is over an hour. Thus, an inference can be made that it is likely that the word processing session will soon terminate. Such an inference can be made in the method 900 at 940 and/or such inferences may have been made earlier and stored in the schema. Thus, one example of the present invention facilitates generating, managing and/or accessing a schema that stores software data and/or inferences concerning the software data. The schema also facilitates employing the stored data in utility optimizing channel management decisions, by providing an extensible, portable data tailored to managed communication.

At 950, a determination is made concerning whether the schema should be updated based, for example, on the selection of the communication channel that optimizes the utility of the communication. For example, the schema may store state information, (e.g., which channels are being employed by what parties at what time for what purpose) that can impact subsequent decisions made based on data in the schema. Therefore, if the determination at 950 is YES, at 960 the schema will be updated with, for example, state information and/or decision information. Such decision information can include, but is not limited to, inferences made at 940, context that changes based on the utility optimizing decision and probabilities determined at 940. The determination at 950 can additionally, and/or alternatively, be based on whether the schema should be updated based on a communication data associated with the communication. For example, the selection of a communication channel at 940 can impact the time at which a communication is likely to occur and its expected length. Such data can be employed in subsequent utility optimizing decisions (e.g., to determine the likely availability of a channel, device or party) and thus the schema upon which a subsequent decision maker will rely can benefit from having such state information updated. The determination at 950 can also include deciding whether an element and/or attribute declaration should be updated. For example, if data has been received from an instance of an element ten thousand times and one of the element values has never been employed in a utility calculation, then the schema element declaration can be updated to remove the apparently superfluous field.

Figure 10:
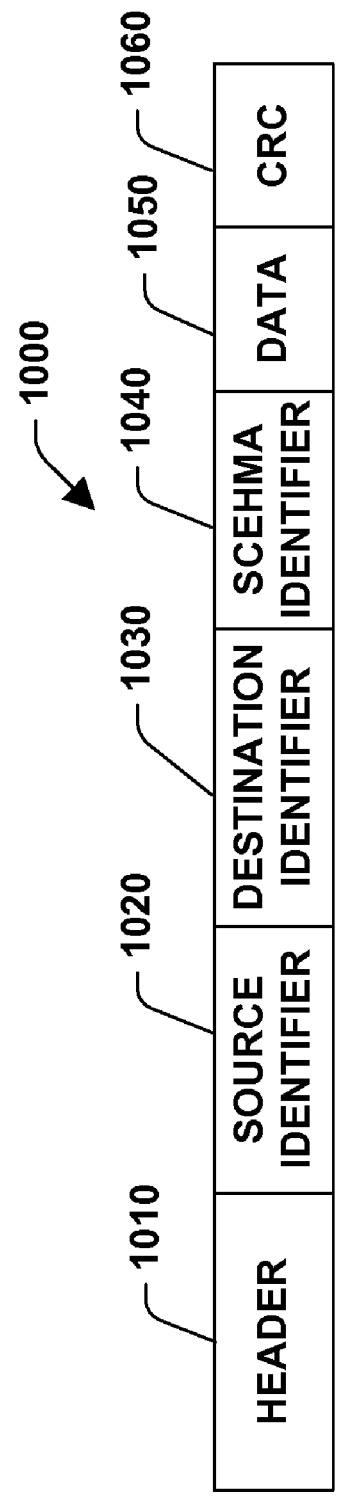
FIG. 10 illustrates a data packet that can be transmitted between computer components, in accordance with an aspect of the present invention.

Referring now to FIG. 10, information can be transmitted between various computer components associated with the schema generation and management functions described herein via a data packet 1000. The schema can simplify transmitting the data packet 1000 by including element declarations like:

<!ELEMENT data_packet(header, source, dest, schema, data*, crc)>
<!ELEMENT header (length, type)>

An exemplary data packet 1000 is shown. The data packet 1000 includes a header field 1010 that includes information such as the length and type of packet. For example, the header field 1010 can indicate whether the packet 1000 is a packet type that requires a response from the receiving device. A source identifier 1020 follows the header field 1010 and includes, for example, an address of the computer component from which the packet 1000 originated. Following the source identifier 1020, the packet 1000 includes a destination identifier 1030 that holds, for example, an address of the computer component to which the packet 1000 is ultimately destined. Such source and destination identifiers can be, for example, globally unique identifiers, URLs (uniform resource locators), path names, and the like. A schema identifier 1040 includes information that identifies the schema with which the data packet is identified. For example, a first computer component can send the data packet 1000 to a second computer component, neither of which is a schema generator or a schema data store, and thus the schema identifier can be employed to facilitate identifying the schema with which the data in a data field 1050 is associated. The schema identifier can be, for example, a globally unique identifier, a URL, a path name, and the like. The data field 1050 in the packet 1000 includes various information intended for the receiving computer component. The data packet 1000 ends with a cyclical redundancy check (CRC) field 1050 that serves as an error detecting field whereby a receiving computer component can determine if it has properly received the packet 1000. While six fields are illustrated in data packet 1000, it is to be appreciated that a greater and/or lesser number of fields can be present in data packets employed by the present invention.

Figure 11:
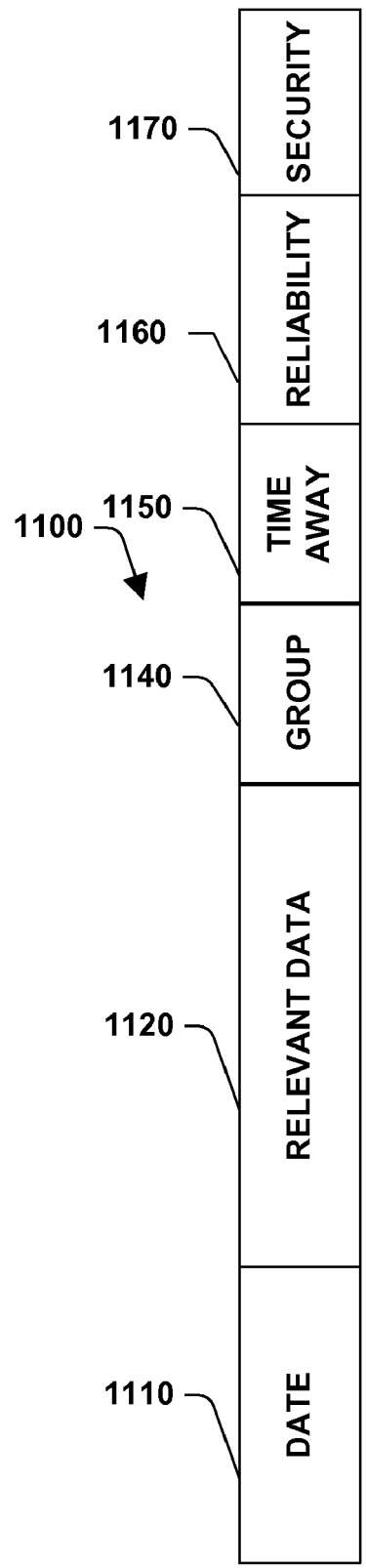
FIG. 11 illustrates sub-fields of a data field from a data packet that can be transmitted between computer components, in accordance with the present invention.

FIG. 11 is a schematic illustration of sub-fields 1100 within the data field 1050 (FIG. 10). The sub-fields 1100 discussed are merely exemplary and it is to be appreciated that a greater and/or lesser number of fields could be employed with various types of data germane to schema generation, management and communication utility optimization. A schema can simplify transmitting such fields by including an element declaration like:

<!ELEMENT subfields(date?, preference?, context?, group?, taway?, security?)>

The sub-fields 1100 can hold deterministic data and/or inferences generated concerning such data and/or missing data values. The sub-fields 1100 include a date field 1110 that includes, for example, information concerning the date on which the data packet 1000 (FIG. 10) was transmitted. The date field 1110 can also hold, for example, information concerning a date on which the schema information was retrieved, which facilitates backing out of transactions employing the data packet 1000 (FIG. 10). A preference field 1120 stores information concerning the preference(s) of the communicating parties. Such preference information can include, but is not limited to, preferred communication time, preferred communication day, preferred communicating parties, preferred hardware, preferred software, preferred communication policies and preferred interruptability. Thus, preference information stored in the preference field 1120 is made available to utility optimizing calculations through the transmission of the packet 1000 (FIG. 10) and the related sub-fields 1100.

A context field 1130 stores information concerning the context(s) of the communicating parties. Such context information can include, but is not limited to, activity type, location, calendar, communication history, ambient noise, time on task, gaze tracks, communication needs, and attentional status. Thus, context information stored in the context field 1130 is made available to utility optimizing calculations through the transmission of the packet 1000 (FIG. 10) and the related sub-fields 1100.

The sub-fields 1100 can also include a group data field 1140 that holds group information including, but not limited to, group identity data, group preference data and group context data. The sub-fields 1100 can also include a time away data field 1150 that holds time away information including, but not limited to, how long a person has been away from a task, how long a person has been away from a computer component, historical data associated with average timesaway, calendar information, and information associated with the likelihood that a person will return to a task and/or device. The sub-fields 1100 can also include a reliability data field 1160 that holds reliability information including, but not limited to, a current likelihood of degradation, an expected likelihood of degradation, a current likelihood of disconnection, an expected likelihood of disconnection, a current likelihood of security compromise, an expected likelihood of security compromise, a mean time between failure of a communication channel, an average failure duration on a communication channel, an average percent degradation of a communication channel, an atmospheric condition data, a scheduled communication channel maintenance data, a scheduled communication channel downtime data, an expected duration of a communication, a reliability history of a communication channel, a lost connection cost, a reconnecting cost, an attentional status of a communicating party, an activity of a communicating party, a utility of a partially completed communication, a frustration factor cost of a lost connection, a monetary cost for a lost connection, an opportunity cost for a lost connection, a time delay cost for reconnection, and an embarrassment cost.

The sub-fields 1100 can also include a security data field 1170 that holds security related information including, but not limited to, the current level of security applied to a communication, the desired level of security applied to a communication, the current level of security applied to a data packet transmission, the desired level of security applied to a data packet transmission and the minimum acceptable level of security for a communication and/or data packet transmission. Such security levels can be computed, for example, from data carried in other sub-fields (e.g., preference, context). By way of illustration, a contactee may desire a specific level of security for communications occurring over specific devices. Such preferences can be stored in the schema and placed in the preference field 1120. Similarly, observed context data can be stored in the schema and placed in the context field 1130. Thus, the security field 1170 can be populated, in one example of the present invention, by applying the context field 1130 contents to the preferences field 1120 contents.

Given the rich and expansive set of data that a communication manager can consider when determining a communication time, channel, group and security, it has conventionally been difficult, if possible at all to provide a coherent, portable, accessible set of data to simplify such determinations and to transmit data concerning such a data set. Therefore, the present invention facilitates generating a schema that can be accessed by a utility optimizing communication manager via data communication packets described above.

Figure 12:
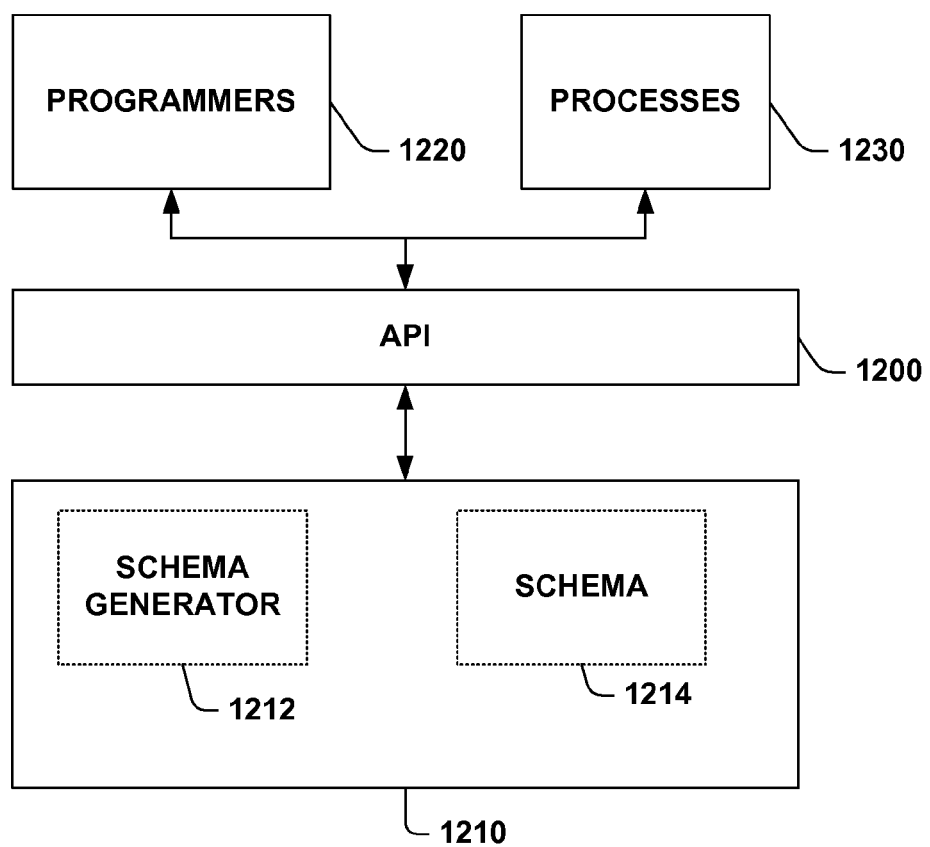
FIG. 12 illustrates an application programming interface employed in accordance with an aspect of the present invention.

Referring now to FIG. 12, an application programming interface (API) 1200 is illustrated providing access to a system 1210 that includes a schema generator 1212 and a schema 1214. The API 1200 can be employed, for example, by programmers 1220 and/or processes 1230 to gain access to processing performed by the system 1210. For example, a programmer can write a program to access a schema generator 1212 (e.g., to invoke its operation, to monitor its operation, to access its functionality) where writing such a program is facilitated by the presence of the API 1200. Thus, rather than the programmer having to understand the internals of the schema generator 1212, the programmer's task is simplified by merely having to learn the interface to the schema generator 1212. This facilitates encapsulating the functionality of the schema generator 1212 while exposing that functionality. Similarly, the API 1200 can be employed to provide data values to the system 1210 and/or retrieve data values from the system 1210. For example, a process 1230 that retrieves channel information can provide channel data to the schema generator 1212 and/or the schema 1214 via the API 1200 by, for example, using a schema write call provided in the API 1200. Thus, in one example of the present invention, a set of application program interfaces can be stored on a computer-readable medium. The interfaces can be executed by a computer component to gain access to a schema generating and managing program. Such interfaces can include, but are not limited to, a first interface that receives a context data associated with a communicating party, a second interface that receives a preference data associated with a communicating party, and a third interface that receives a schema data generated from the context data and the preference data.

Figure 13:
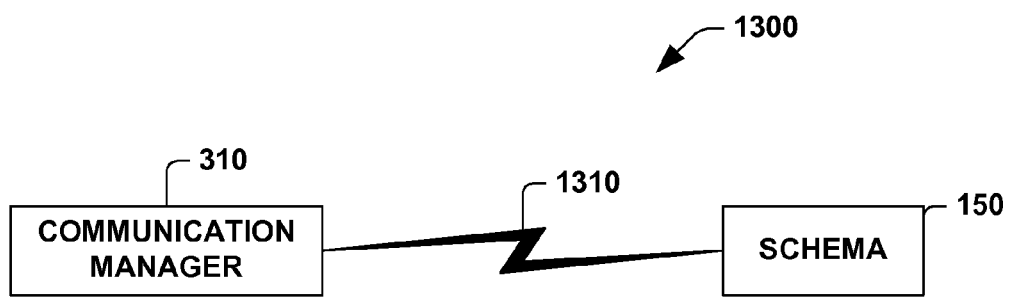
FIG. 13 illustrates a carrier wave employed in accordance with an aspect of the present invention.

FIG. 13 displays a system 1300 that employs a computer readable signal 1310 that encodes information for use in a computer component that generates, accesses and/or manages a schema related to utility optimizing communication management. The signal 1310 can be carried, for example, in a wire, in a fiber, or over the air. The signal can be, for example, analog or digital. Methods for encoding data in signals are well known in the art (e.g., radio transmission (am/fm), wire transmission (e.g., 802.3, 802.5)) and are not discussed herein for the sake of brevity. The signal 1310 can carry information between, for example, a schema 150 and a communication manager 310. Thus, data stored in the schema 150 can be made available to the communication manager 310 via the signal 1310. In one example of the present invention, the signal 1310 includes a first signal component that stores information associated with a context of a communicating party, a second signal component that stores information associated with a preference of a communicating party, and a third signal component that stores information associated with a schema in which the context and preference are stored. While three signal components are described, it is to be appreciated that the signal 1310 can include a greater and/or lesser number of signal components.

Figure 14:
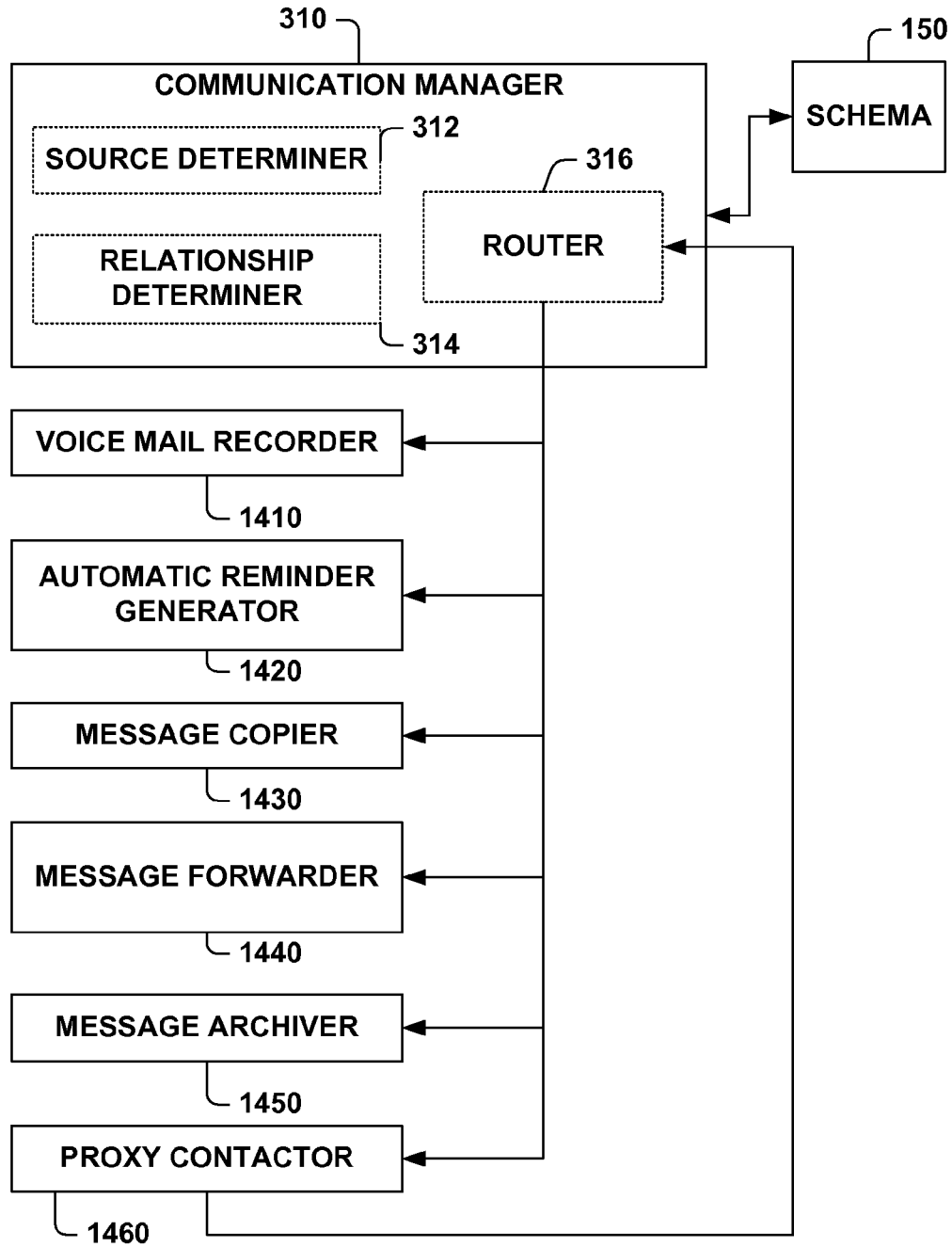
FIG. 14 illustrates one example of a schema being employed by a communication manager, in accordance with an aspect of the present invention.

FIG. 14 illustrates a system 1400 that receives information from a schema 150 that facilitates managing a communication to optimize utility of the communication. The system 1400 includes a communication manager 310 that receives a schema input from the schema 150. The schema input can be associated, for example, with a communication, a communication channel, a communicating party, a preference, a context, a reliability, a group, a time away, a security, and the like. The schema input can be, for example, data retrieved from instances of declared elements, element declarations and/or attribute declarations. In the example illustrated in FIG. 14, the schema input will be discussed in the context of communication data (e.g., communicating parties and time) that can be employed to route a communication according to communication policies established by the communicating parties and/or the communication manager 310. Thus, the communication manager 310 includes a router 316 that decides between destinations for the communication based, at least in part, on the schema input. Such destinations can include, but are not limited to, a voice mail recorder 1410, an automatic reminder generator 1420, a message copier 1430, a message forwarder 1440, a message archiver 1450, and a proxy contactor 1460.

By way of illustration of the operation of the router 316, a schema input from the schema 150 can include information about a communication including the identities of the communicating parties, the subject matter of the communication, the channel(s) employed in the communication and a set of communication policies associated with the parties, communication and channel(s). For example, the schema input can be retrieved from one or more instances of elements that are declared like:

<!ELEMENT routing(identity*, subject*, channels*, policy?)>

The router 316 receives the schema input, analyzes the available data, and/or inferences concerning missing pieces of data, and attempts to adhere to the communication policies. Therefore, the router 316 can attempt to make the communication to preferred devices, people, and/or computer components in the order specified in the communication policy. However, the schema input may include data that indicates that certain devices, people and/or computer components are not available, are unreliable, are too costly too employ, and so on. Therefore, the router 316 can progress to different devices, people and/or computer components to optimize the utility of the communication while adhering to the communication policies. While six destinations are provided for the router 316 in the system 1400, it is to be appreciated that a greater and/or lesser number of destinations can be employed in accordance with the present invention.

In another example of a system that can access the schema 150, the communication manager 310 includes a source determiner 312 that identifies the source of a communication. The source determiner 312 can make such an identification based, for example, on information received via the schema input. By way of illustration, a schema input associated with a communication can identify the time of a communication, the channel over which it is traveling and voice pattern data but may not include an identification of the source of the communication (e.g., device identity, communicating party identity). Since the router 316 can determine to which destination(s), if any, to route a communication based on the identity of the sender (e.g., highly trusted associated, known purveyor of spam), the source determiner 312 can process the available information to either deterministically identify the source and/or to provide a probability concerning the identity of the sender, which facilitates optimizing utility of a communication by facilitating adherence to preferences and communication policies.

In another example of a communication manager 310 that can access the schema 150, the communication manager 310 includes a relationship determiner 314 that receives a schema input from the schema 150 and determines relationships between, for example, communicating parties, communicating devices and communication messages. By way of illustration, the schema input can include information that facilitates identifying a relationship between communicating parties. Such a relationship can be employed to determine to which destination(s), if any, the router 316 will route a message. For example, identifying a close family relationship may permit the router 316 to route a communication to a real-time communication device (e.g., cell phone) with a high priority (e.g., breakthrough priority) while identifying a work relationship where the contactor is two or more levels below the contactee in an organizational chart can constrain the router 316 to routing the communication to a non-real time communication device (e.g., voice mail). By way of further illustration, the schema input can provide the relationship determiner 314 with information that facilitates identifying a relationship between communicating devices. For example, the relationship determiner 314 can examine source and destination addresses associated with devices involved in a first communication and determine, via context, hardware and/or software data, for example, that the communicating devices are on a network that will support a first (e.g., 10 Mb/sec) data transfer rate and thus the communication can occur at that rate. But a second set of source and destination addresses may only be able to communicate at a slower second rate (e.g., 56 Kbps). Thus, information stored in the schema 150 facilitates optimizing utility in managed communications by providing information that can be employed to identify relationships between communicating parties, devices and/or processes.

Figure 15:
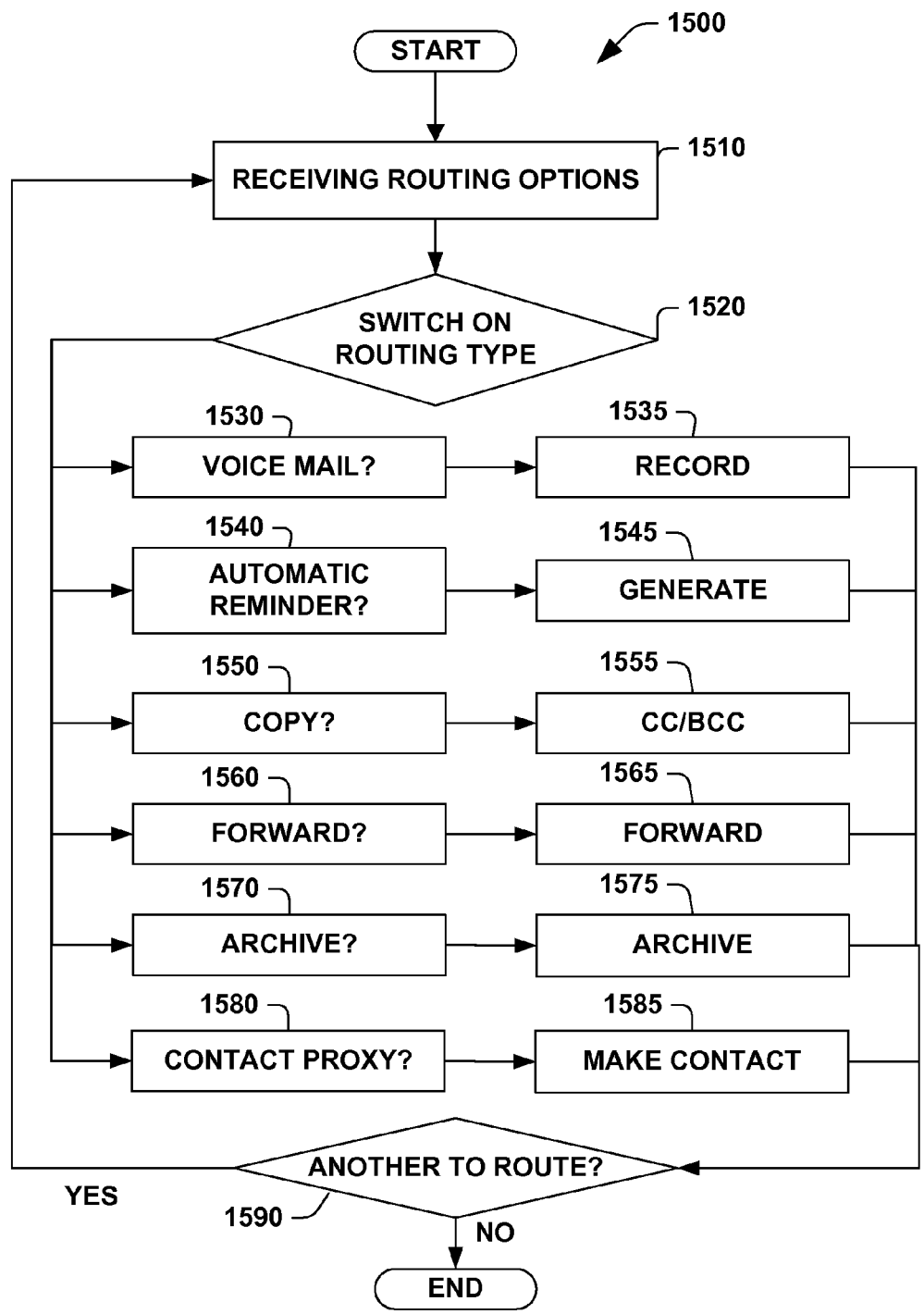
FIG. 15 is a flow chart that illustrates a communication management method employing a schema, in accordance with an aspect of the present invention.

FIG. 15 is a flow chart that illustrates a computer-implemented method 1500 for routing communications based on information received from a schema generated, managed and/or maintained by the present invention. At 1510, the method receives routing options. Such options can be retrieved, for example, from an XML file that stores an XML schema and that is populated with data values including communication policies, available hardware, available software, and communication data (e.g., contactor identity, contactee identity). Based on such received information, the method 1500 can, at 1520, make a determination of how to route the communication. Such a determination can be performed, for example, by matching communicating party identities with context data, preference data, and communication policies available in the schema.

By way of illustration, at 1530, a determination can be made whether the routing options (e.g., the context of the communicating parties, the preferences of the communicating parties, and the communication policies of the contactee) indicate that the communication should be routed to voice mail. If the determination at 1530 is YES, then the communication can be routed, at 1535, to a voice mail recording computer component, for example. A contactee may have established a communication policy that is stored in the schema that is a logical OR of conditions that indicate that a communication should be routed to voice mail. For example, a rule like "If the contactor is Keith, Susann, Danny, or Christopher, OR, if I am actively engaged in a high priority task, OR, if I am at work but away from my desk, OR, if the background ambient noise indicates that I would not be able to hear a telephone call, then route the communication to voice mail". Such a rule can be encoded in a communication policy that is stored in a schema generated, managed and/or maintained by the present invention.

Other routing decisions can include, but are not limited to: at 1540, determining whether an automatic reminder should be made and if so, at 1545, routing the communication to a reminder generator; at 1550, determining whether the communication should be copied to one or more additional contactees and if so, at 1555, carbon copying and/or blind carbon copying the communication to such additional contactees; at 1560, determining whether a communication should be forwarded to an additional party(s) and if so, at 1565, forwarding the message to such party(s); at 1570, determining whether a communication should be archived (e.g., an order confirmation that needs to be recorded), and if so, at 1575, routing the message to an archiver (e.g., tape backup unit); and, at 1580, determining whether the message should be routed to a proxy. For example, a breakthrough priority communication may arrive (e.g., communication from judge concerning temporary restraining order), but the contactee (e.g., lead litigator) may be unavailable (e.g., in a plane during takeoff/landing). Thus, the method 1500 can determine that this time critical communication should be routed to the contactee's proxy (e.g., second chair litigator) who can make a decision for the primary contactee and therefore, at 1585, such communication can be routed to the proxy.

At 1590, a determination is made concerning whether the method 1500 is going to route another communication. If the determination at 1590 is YES, then processing can return to 1510, otherwise, processing can conclude.

Figure 16:
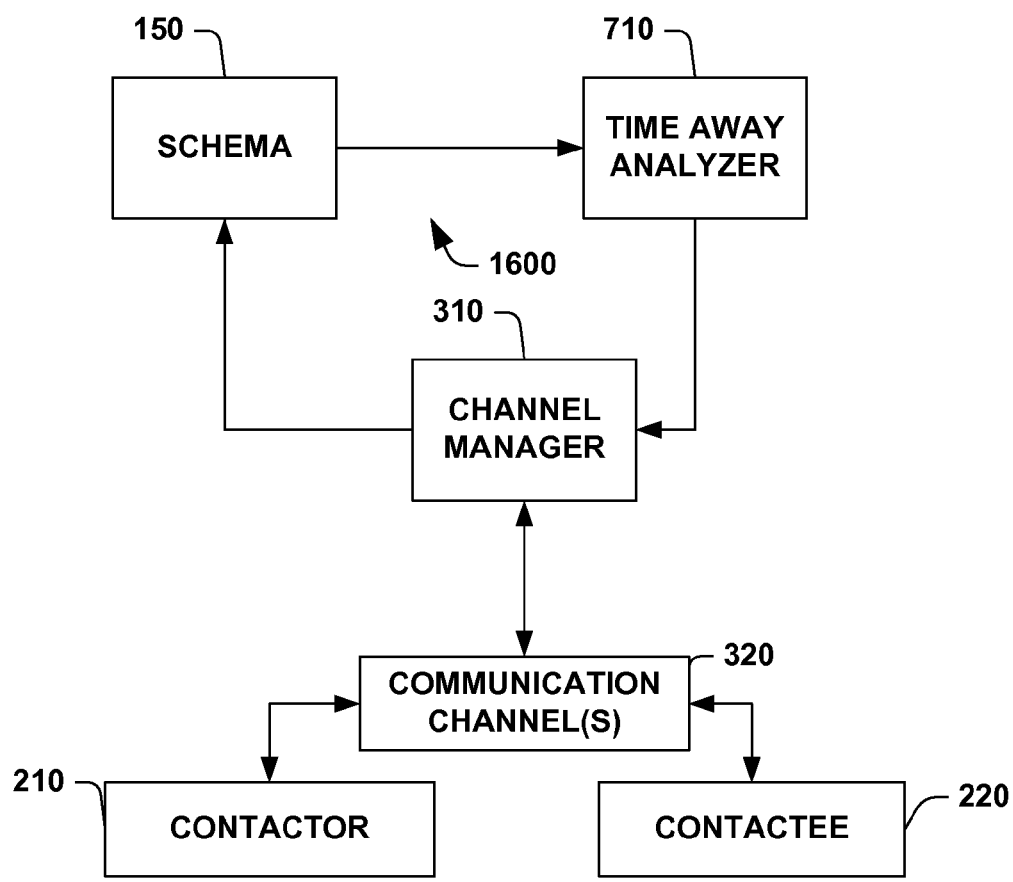
FIG. 16 is a block diagram of a communication management system accessing data from and feeding back data to a schema, in accordance with an aspect of the present invention.

Turning now to FIG. 16, one example feedback loop 1600 in which a schema 150 that is created, managed and/or maintained by the present invention can participate is illustrated. The feedback loop 1600 includes the schema 150, a time away analyzer 710 and a channel manager 310 that selects a communication channel(s) 320 through which a contactor 210 and a contactee 220 will communicate. Data (e.g., preference, context, channel, groups, policies, reliability) is stored in the schema 150 and made accessible to the channel manager 310 and time away analyzer 710 via, for example, the data packets and/or signals described herein. The channel manager 310 makes communication channel decisions based on the schema 150 and in turn provides updates to the schema 150 that reflect the communication channel decisions. Similarly, the time away analyzer 710 makes communication management related decisions and provides feedback to the schema 150. Thus, the schema 150 both affects, and is affected by the channel manger 310 and the time away analyzer 710. Other feedback loops can include processing associated with, for example, group processing, reliability analyzing, override analyzing and the like.

Figure 17:
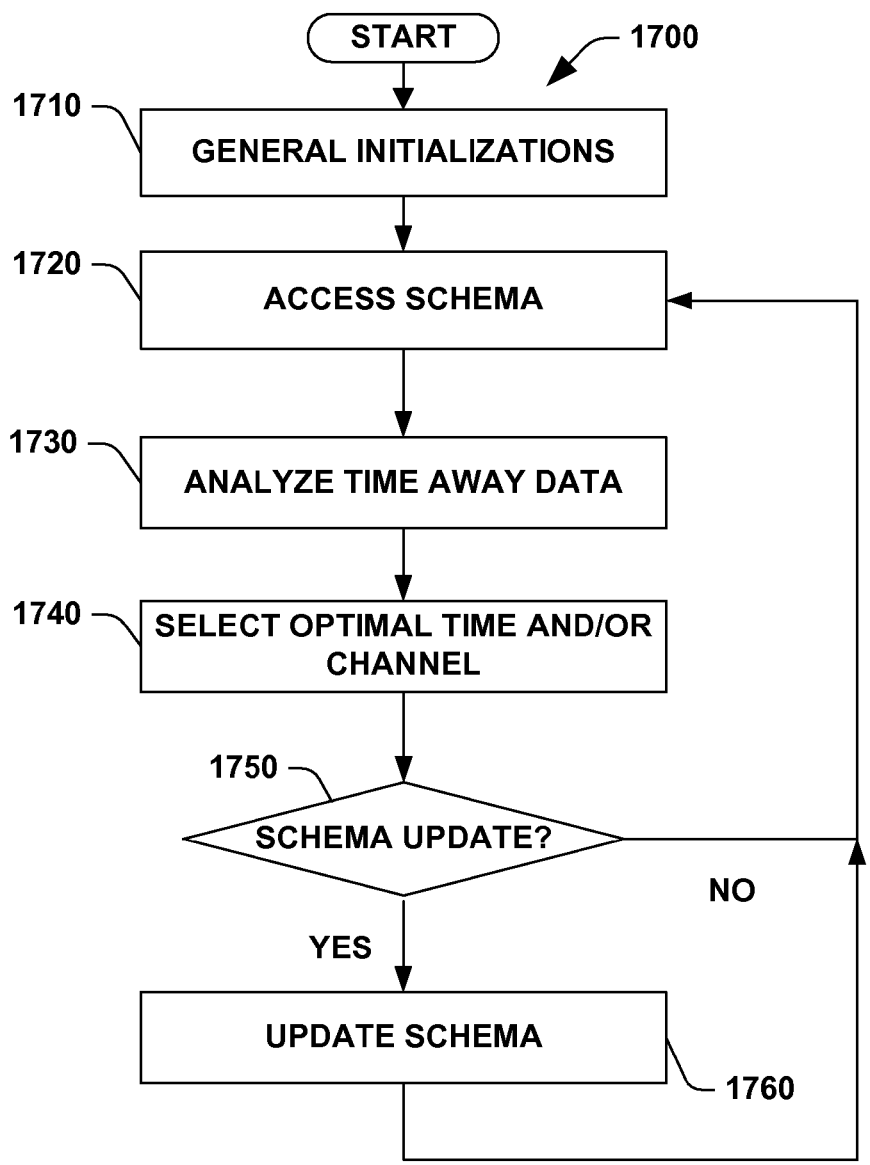
FIG. 17 is a flow chart illustrating a communication management method that accesses data from a schema and feeds data back to the schema, in accordance with an aspect of the present invention.

FIG. 17 illustrates a computer-based method 1700 associated with a feedback loop wherein a schema provides data to various processes and in turn receives feedback from the processes that can cause the schema to be updated. At 1710, general initializations occur. Such initializations can include, but are not limited to, identifying a schema, locating a schema, identifying computer components in the feedback loop, allocating memory, establishing pointers, establishing data communications, acquiring resources, setting variables and displaying process activity. At 1720, a schema is accessed. For example, a read can be made from an XML file that stores elements and attributes that model data like preference data, context data, communication policy data, and the like. The access at 1720 can result in a data packet being transmitted to the method 1700. The access at 1720 can also result in a signal being sent to the method 1700. At 1730, information gained during the access at 1720 is analyzed. In FIG. 17, the data that is analyzed is time away data (e.g., actual time away from a process/task/device/computer component, predicted time away from a process/task/device/computer component). The analysis can include identifying existing pieces of data, identifying missing pieces of data, inferring value for missing pieces of data, and the like. It is to be appreciated that other types of data (e.g., security, communication, channel) can be accessed and analyzed by the method 1700. At 1740, based, at least in part, on the data accessed at 1720 and analyzed at 1730, an optimal time and/or channel for a communication can be selected. For example, a function that optimizes the expected utility of a communication based, at least in part, on the data accessed at 1720 and analyzed at 1730 can be applied to select the optimal time and/or channel.

Data concerning the decision made at 1740 can be fed back to the schema to update the schema. For example, if the schema stores state (e.g., availability of a device, availability of a person), and the decision at 1740 affects such state (e.g., device in use, person engaged in communication), then the schema can benefit from being updated to reflect such change in state. Therefore, at 1750, a determination is made concerning whether to update the schema. If the decision at 1750 is YES, then at 1760 the schema is updated, otherwise, processing can return to 1720. Updating the schema at 1760 can involve sending a data packet and/or signal from the method 1700 to the schema(s) that were accessed at 1720 where the data packet and/or signal can carry information concerning, for example, a changed state. Thus, it is to be appreciated that the schema that is created, accessed and/or managed by the present invention can be a dynamic entity that provides data for communication management decisions and is in turn affected by such decisions.

Figure 18:
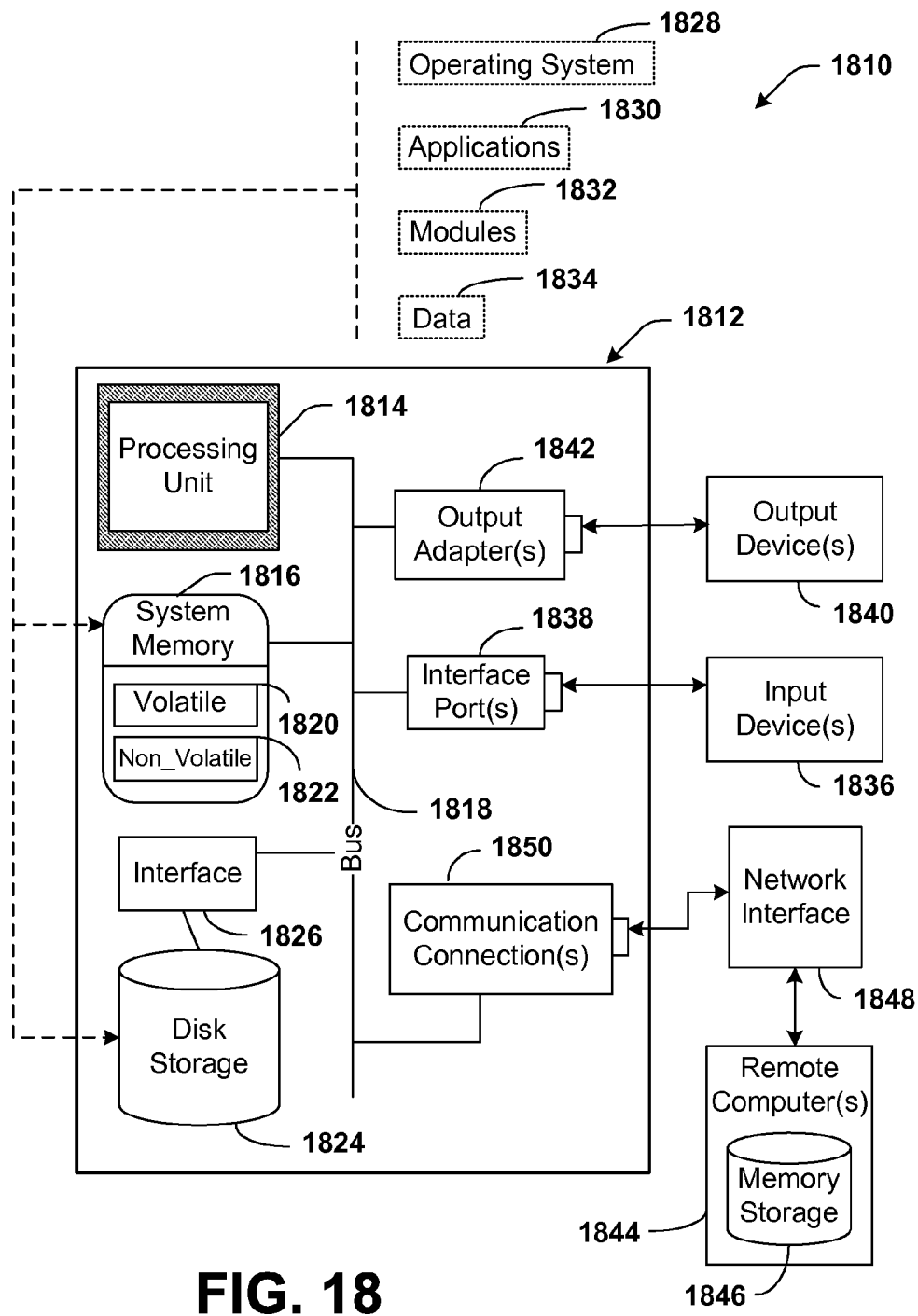
FIG. 18 is a schematic block diagram of an example computing environment in which the present invention can be employed.

In order to provide additional context for various aspects of the present invention, FIG. 18 and the following discussion are intended to provide a brief, general description of a suitable computing environment 1810 that can create, manage, and/or access the schema of the present invention. While the computing environment that can produce and/or manage the schema is described in the general context of computer-executable components, instructions and/or operations that may run on one or more computers, those skilled in the art will recognize that the computing environment can also be implemented in combination with other program modules and/or as a combination of hardware and software. Generally, program modules include routines, programs, components, data structures, etc. that perform particular tasks or implement particular abstract data types. Moreover, those skilled in the art will appreciate that the computing environment can include other computer system configurations, including single-processor or multiprocessor computer systems, minicomputers, mainframe computers, personal computers, hand-held computing devices, microprocessor-based or programmable consumer electronics, and the like, each of which may be operatively coupled to one or more associated devices. The computing environment can also include a distributed computing environment where certain tasks are performed by remote processing devices that are linked through a communications network. In a distributed computing environment, program modules may be located in both local and remote memory storage devices.

With reference to FIG. 18, an exemplary environment 1810 that can produce and/or manage various aspects of the invention includes a computer 1812, the computer 1812 including a processing unit 1814, a system memory 1816 and a system bus 1818. The system bus 1818 couples system components including, but not limited to the system memory 1816 to the processing unit 1814. The processing unit 1814 may be any of various processors. Dual microprocessors and other multi-processor architectures also can be employed as the processing unit 1814.

The system bus 1818 can be any of several types of bus structure including a memory bus or memory controller, a peripheral bus and a local bus using any of a variety of bus architectures. The system memory 1822 includes read only memory (ROM) 1820 and random access memory (RAM) 1822. A basic input/output system (BIOS), containing the basic routines that help to transfer information between elements within the computer 1812, such as during start-up, is stored in ROM 1820.

The computer 1812 further includes a hard disk drive 1824, a magnetic disk drive 1826, (e.g., to read from or write to a removable disk 1828) and an optical disk drive 1830, (e.g., for reading a CD-ROM disk 1832 or to read from or write to other optical media). The hard disk drive 1824, magnetic disk drive 1826 and optical disk drive 1830 can be connected to the system bus 1818 by a hard disk drive interface 1834, a magnetic disk drive interface 1836 and an optical drive interface 1838, respectively. The drives and their associated computer-readable media provide nonvolatile storage of data, data structures, computer components, computer-executable instructions, etc. for the computer 1812. Although the description of computer-readable media above refers to a hard disk, a removable magnetic disk and a CD, it should be appreciated that other types of media that are readable by a computer, such as zip drives, magnetic cassettes, flash memory cards, digital video disks, cartridges, ASICs, and the like, may also be used in the exemplary operating environment, and further that any such media may contain computer-executable instructions for performing the methods associated with the present invention.

A number of program modules can be stored in the drives and RAM 1822, including an operating system 1840, one or more application programs 1842, other program modules 1844 and program data 1846. It is to be appreciated that the computing environment can be implemented with various operating systems or combinations of operating systems.

A user can enter commands and information into the computer 1812 through a keyboard 1848 and a pointing device, such as a mouse 1850. Other input devices (not shown) may include a microphone, an IR remote control, a joystick, a game pad, a satellite dish, a scanner, or the like. These and other input devices are often connected to the processing unit 1814 through a serial port interface 1852 that is coupled to the system bus 1818, but may be connected by other interfaces, such as a parallel port, a game port, a universal serial bus ("USB"), an IR (infrared) interface, etc. A monitor 1854 or other type of display device is also connected to the system bus 1818 via an interface, such as a video adapter 1856. In addition to the monitor, a computer typically includes other peripheral output devices (not shown), such as speakers, printers etc.

The computer 1812 may operate in a networked environment using logical connections to one or more remote computers, such as a remote computer(s) 1858. The remote computer(s) 1858 may be a workstation, a server computer, a router, a personal computer, microprocessor based entertainment appliance, a peer device or other common network node, and typically includes many or all of the elements described relative to the computer 1812, although, for purposes of brevity, only a memory storage device 1860 is illustrated. The logical connections depicted include a local area network (LAN) 1862 and a wide area network (WAN) 1864. Such networking environments are commonplace in offices, enterprise-wide computer networks, intranets and the Internet.

When used in a LAN environment, the computer 1812 is connected to the local network 1862 through a network interface or adapter 1866. When used in a WAN environment, the computer 1812 typically includes a modem 1868, or is connected to a communications server on the LAN, or has other means for establishing communications over the WAN 1864, such as the Internet. The modem 1868, which may be internal or external, is connected to the system bus 1818 via the serial port interface 1852. In a networked environment, program modules depicted relative to the computer 1812, or portions thereof, may be stored in the remote memory storage device 1860. It will be appreciated that the network connections shown are exemplary and other means of establishing a communications link between the computers may be used.

Figure 19:
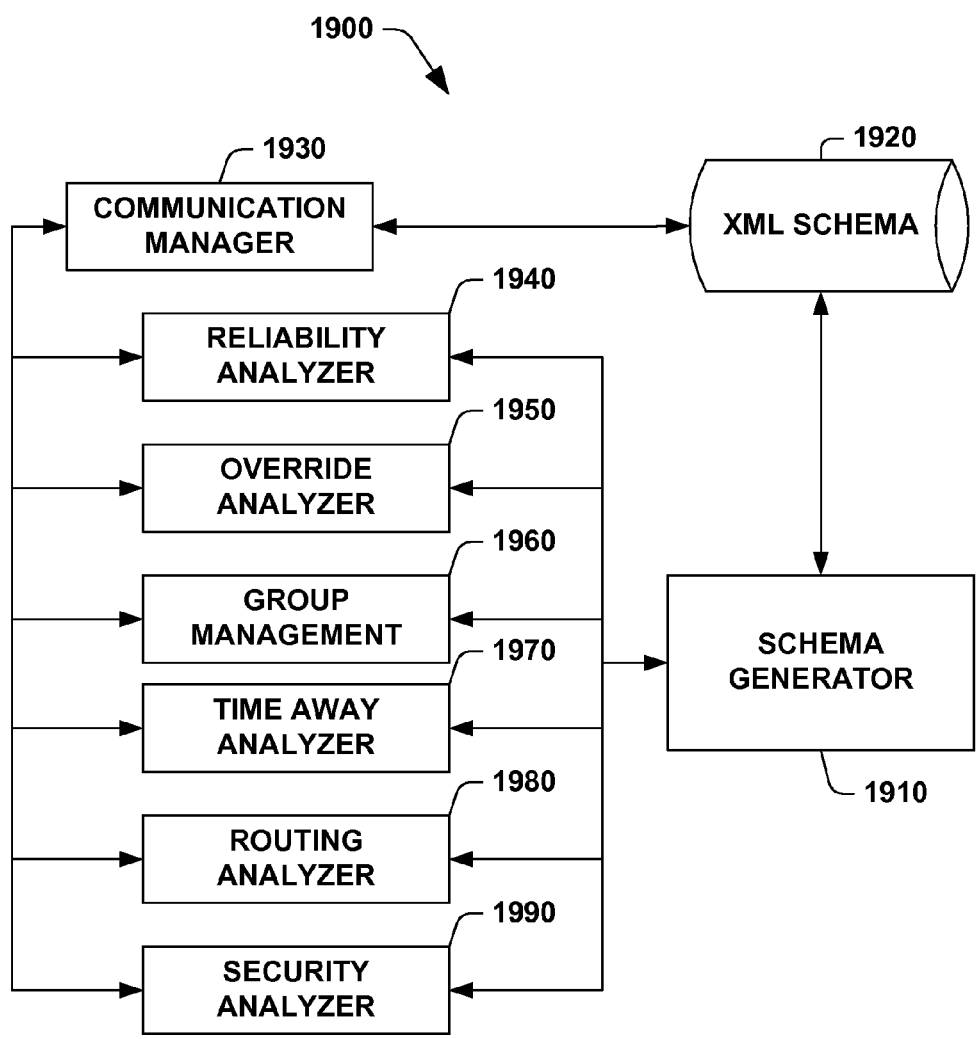
FIG. 19 is a block diagram of an XML schema being employed by a communication manager, in accordance with an aspect of the present invention.

FIG. 19 illustrates one sample environment 1900 for which a schema generator 1910 can produce an XML schema 1920 that will facilitate utility optimizing decisions made by a communication manager 1930. While previous figures have addressed many of the components illustrated in FIG. 19 individually, the system 1900 is a complex system that illustrates the flexibility and complexity that the example XML schema 1920 can accommodate.

The system 1900 includes a reliability analyzer 1940. Thus, the XML schema 1920 can contain elements and attributes for storing and making accessible reliability data. For example an XML element like:

<!ELEMENT reliability(channel, mean_time, avg_duration, failure_detail*)> can be defined in the schema 1920 to facilitate storing information associated with the mean time between failure for a channel, the average duration of failure for a channel and a textual description of recent failures. Such an element can be evaluated by a communication manager 1930 and/or reliability analyzer 1940 to facilitate selecting a utility optimizing communication channel.

The system 1900 also includes an override analyzer 1950 that can determine whether a communication channel selection should be override. The schema 1920 may therefore include an element like:

<!ELEMENT override(channel, act_level, scheduled_maintenance?, security*)> that facilitates storing information valuable to an override decision like the expected activity level for a channel, scheduled maintenance times and likely security levels at various times. Therefore, while the communication manager 1930 can initially select a channel, the data stored in the override element in the schema 1920 can provide the override analyzer 1950 with information that causes the channel selection to be overridden (e.g., lengthy communication likely to overlap with scheduled channel maintenance).

The system 1900 also includes other computer components like a group management component 1960, a time away analyzer 1970, a routing analyzer 1980 and a security analyzer 1990, each of which can have related elements defined in the XML schema 1920. Thus, the XML schema 1920, which in one example of the present invention can be stored in a binary large object (BLOB), facilitates storing and managing portable data associated with communication management.

Figure 20:
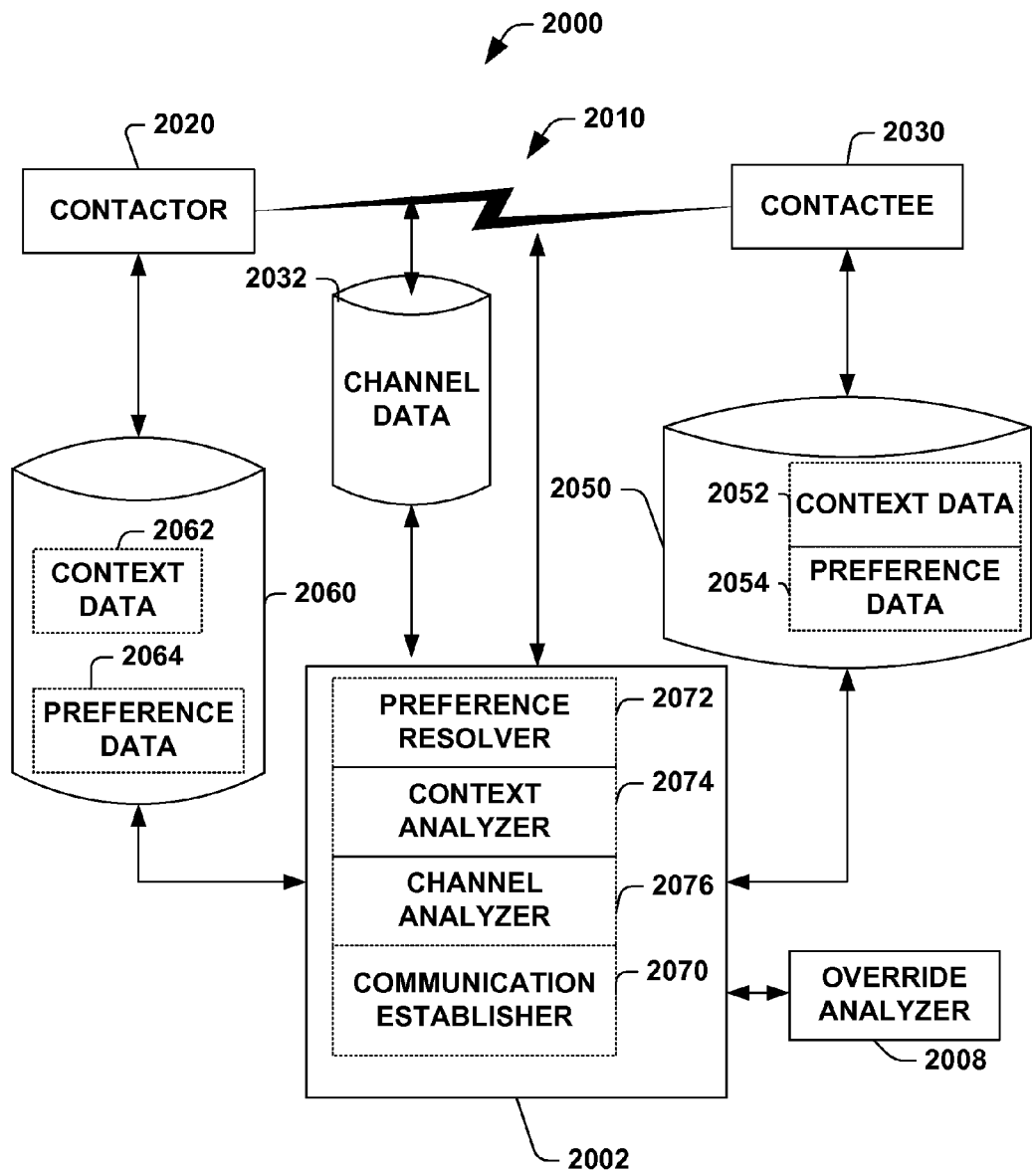
FIG. 20 is a schematic block diagram of an exemplary communications system in which the present invention can be employed.

Referring now to FIG. 20, a system 2000 is illustrated that can be employed in conjunction with various aspects of the present invention as previously described. A channel manager 2002 identifies communication channels that facilitate optimizing the utility of a communication 2010 between a contactor 2020 and a contactee 2030. While one contactor 2020 and one contactee 2030 are illustrated, it is to be appreciated that the system 2000 facilitates identifying optimal communication channels between two or more communicating parties (e.g., communication groups). It is to be further appreciated that the parties to the communication 2010 may include human parties, apparatus and/or electronic processes. Thus, as employed herein, the terms contactee and contactor include groups of contactors and groups of contactees.

The communication 2010 may be carried over a variety of channels including, but not limited to, telephone channels, computer channels, fax channels, paging channels and personal channels. The telephone channels include, but are not limited to POTS telephony, cellular telephony, satellite telephony and Internet telephony. The computer channels can include, but are not limited to email, collaborative editing, instant messaging, network meetings, calendaring and devices employed in home processing and/or networking. The personal channels include, but are not limited to video-conferencing, messengering and face-to-face meeting. Data concerning a current channel (e.g., a phone that is busy) can be analyzed, as can data concerning the likelihood that the channel may become available (e.g., phone will no longer be busy).

Identifying the optimal communication channel can include considering the benefits of establishing the communication 2010 at a first point in time, with the communication channels available at that point in time, and considering the costs of delaying establishing the communication 2010 to a second point in time when other communication channels may be available.

The channel manager 2002 has access to a channel data store 2035, a contactor data store 2060 and a contactee data store 2050. The contactor data store 2060, the channel data store 2035 and the contactee data store 2050 can store data in data structures including, but not limited to one or more lists, arrays, tables, databases, stacks, heaps, linked lists and data cubes and can reside on one physical device and/or can be distributed between two or more physical devices (e.g., disk drives, tape drives, memory units). Furthermore, the contactor data store 2060, the channel data store 2035 and the contactee data store 2050 can reside in one logical device and/or data structure.

The channel manager 2002 can be a computer component, as that term is defined herein, and thus the channel manager 2002 can be distributed between two or more cooperating processes and/or reside in one physical or logical device (e.g., computer, process).

In a general formulation of the problem addressed by the channel manager 2002, the present invention considers a "communications value function", $f$, that returns a value for each communication channel or subset of channels under consideration or an ordering over communication channels in terms of acceptability of the channel or subset of channels.

$$\text{Value(Channel)} = f(\text{preferences(contactee, contactor, organization)},$$
$$\text{context(contactee, contactor)})$$

where the context of contactee and contactor include group membership, group context, the devices that are available, the time of day, tasks and situation at hand for the contactor and contactee, and the like. It is to be appreciated that the context of the contactee and contactor may be stored in one or more formats, including, but not limited to, an XML schema. In one example of the present invention, the channel manager 2002 initially orders the channels by assigned value and attempts to create a connection or to advise the contactor 2020 and/or contactee 2030 concerning the best possible connection.

In general, there may be uncertainty concerning preferences and one or more parameters employed to model a context. In this situation, a probability distribution over the different states of variables can be inferred and expected values for channels can be computed. For example, if there is uncertainty concerning aspects of the context of the contactee, the probability distribution (here represented abstractly), given evidence E observed about the context, and sum over the uncertainties can be represented:

$$\text{Expected value(Channel)} =$$
$$\sum_i f(\text{preferences(contactee, contactor, organization)},$$
$$p(\text{context } i \text{ of contactee} \mid E), \text{context of contractor})$$

While this expected value can be employed to initially identify the channel that is predicted to optimize the utility of the communication 2010, in one example of the present invention the contactee 2030 will be presented with options concerning the communication. The contactee 2030 reaction to the options will then determine the channel that is selected for the communication 2010. The reactions to the options can be employed in machine learning that facilitates adapting the channel manager 2002.

Considering now more specific examples of the use of expected utility, a particular basic formulation of decision-making under uncertainty in the context of the preferences of the contactee 2030 is captured by Equation 1.

$$A^* = \operatorname*{argmax}_{j} \sum_{i} p(\text{context}^R i \mid E) \times \quad \text{(Equation 1)}$$
$$u(A_j, A_k^C, C, \text{context}^R i, \text{context}^C)$$

where A* is the ideal communication actions, which include the channels employed by the contactor ($A^C*$) and contactee (Recipient) ($A^R*$) computed by optimizing Equation 1.

In equation 1, $A_j$ is the communication channel being considered, $A^C_k$ is the communication channel employed by the contactor, $\text{context}^R_i$ is the context of the contactee (Recipient) of the intended communication, $\text{context}^C$ is the context of the contactor, and C is the identity of the contactor, typically linked to a class of person (e.g., critical associate, previously replied to, family, unknown).

Thus, in an example aspect of the present invention, the conditional probability $p(\text{context}^R_i | E)$ that the contactee 2030 has a certain context given the evidence E is employed in conjunction with the utility function u to determine the ideal communication actions that can be taken to maximize the utility of the communication 2010 between the contactor 2020 and the contactee 2030.

The basic formulation for identifying optimal communication channels can be extended by introducing uncertainty about the context of the contactor 2020, which adds the summing noted in equation 2 to the uncertainty calculations of equation 1. The particular communication action and/or channel selected for the initial contact by the contactor 2020 is represented as $A^C_{init}$.

$$A^* = \operatorname*{argmax}_{j} \sum_{i} \sum_{k} p(\text{context}^R i \mid E) p(\text{context}^C k \mid E) \times \quad \text{(Equation 2)}$$
$$u(A_j, A^C_{init}, C, \text{context}^R i, \text{context}^C k)$$

The contactor 2020 and contactee 2030 contexts represent rich sets of deterministic or uncertain variables. Data associated with automated assessments and/or directly marked indications of urgency or importance in the communications can also be evaluated in identifying optimal communication channels. The contextual variables can be treated as explicit deterministic or probabilistic factors in the optimization. For example, $m^c_k$ can represent the channels available to the contactor 2020 and thus equation 3 considers combinations of channels available to the contactor 2020.

$$A^* = \operatorname*{argmax}_{l,n} \sum_{i} \sum_{k} p(\text{context}^R i \mid E) p(\text{context}^C k \mid E) \times \quad \text{(Equation 3)}$$
$$u(A(m_1^R, m_n^C), A^c_{init}, C, \text{context}^R i, \text{context}^C k)$$

The present invention can also compare the best communication option available now with the best communication option that will be available later, and update the value of the communication for the losses based in delays in communication, and potential gains or losses based on changes in disruptiveness if the communication should come at the later time t when the contactee is in a different state (e.g., more available or less available). Such comparison can be captured by equation four:

$$\text{Value}A^{*'}(t_+) - \text{Value}A^*(t_0) = \quad (4)$$
$$\operatorname*{max}_{l,n} \sum_{i} \sum_{k} p(\text{context}^R i \mid E, t_+) p(\text{context}^C k \mid E, t_+) \times u(A(m_l^R(t_+),$$
$$m_n^C(t_+)), A^C_{init}, C, \text{context}^R i(t_+), \text{context}^C k(t_+)) -$$
$$\operatorname*{max}_{l,n} \sum_{i} \sum_{k} p(\text{context}^R i \mid E, t_0) p(\text{context}^C k \mid E, t_0) \times$$
$$u(A(m_l^R(t_0), m_n^C(t_0)), A^C_{init}, C, \text{context}^R i(t_0), \text{context}^C k(t_0))$$

Thus, decision-theoretic formulae like those described in equations 1 through 4 are employed to produce one or more expected utilities for one or more sets of contactors and/or contactees that are established into one or more groups that are subsequently managed. In one example aspect of the present invention, a communication is automatically initiated, scheduled and/or calendared based on such information. But in another aspect of the present invention, information concerning those expected utilities is presented to one or more parties. By way of illustration, a contactor 2020 is presented with a list of communications with high utilities determined in accordance with the preferences of the contactee. The contactor 2020 then selects from the list.

While one communication 2010 between one contactor 2020 and one contactee 2030 is illustrated, it is to be appreciated that a greater number of communications between a similar or greater number of contactors 2010 and/or contactees 2020 can be identified by the present invention. By way of illustration, communications 2010 to facilitate group meetings can be identified by the system 2000, as can multiple communications 2010 between two communicating parties (e.g., duplicate messages sent simultaneously by email and pager).

The communication 2010 that is identified by the channel manager 2002 may depend, at least in part, on one or more sets of data concerning communication channels, contactors and/or contactees, for example. One possible data set, the communication channel data set 2035 concerns the available communication channels. The available communication channels can include, but are not limited to email (of various priorities), telephone (POTS, cellular, satellite, Internet), paging, runners/couriers, video conferencing, face-to-face meeting, instantaneous collaborative editing, delayed posting collaborative editing, picture in picture television, home device activation (e.g., turning on lights in the study, ringing the telephone with a distinctive pattern) and so on. A communication channel may not be a static entity, and thus information concerning the state, capacity, availability, cost etc., of the communication channels can change. Thus, the communication channel data set 2035 can contain current state information and/or data to facilitate making predictions concerning future state, capacity, availability, cost etc. associated with one or more communication channels.

The channel manager 2002 can also have available the contactee data 2050 that includes information related to hardware, software, contactee task being performed, contactee attention status, contactee context data 2052 and contactee preference data 2054, for example. By way of illustration, the hardware data can include information related to what hardware is available to the contactee, what hardware is being employed by the contactee (e.g., desktop, laptop, PDA), the capabilities of that hardware (e.g., enough memory and communication bandwidth for videoconferencing), the cost of employing that hardware and the state(s) in which that hardware is currently functioning (e.g., online, offline). The hardware data can also include information concerning usage patterns that facilitate determining the likelihood that an unavailable piece of hardware will become available. The software data can include information related to what software is available to the contactee, what software is currently being employed by the contactee (e.g., word processor in use), the capabilities of that software (e.g., allows collaborative editing) and the state(s) in which that software is currently functioning (e.g., running and active, running but inactive). The software data can also include information concerning usage patterns that facilitate determining the likelihood that an unavailable piece of software will become available.

The contactee data 2050 can also contain preference data 2054 concerning the preferences of the contactee 2030. The preference data 2054 can include data concerning how the contactee 2050 prefers to be contacted, with those preferences varying over time with respect to, for example, various contactors 2020, various times, various channels and various topics of communication. The contactee preference data 2054 can include data concerning, but not limited to, preferences concerning the time of day for communicating (e.g., early morning, business hours, evening, late night, sleeping hours), the time of the week for communicating (e.g., Monday through Friday, Weekend, Holiday, Vacation), identity of contactors (e.g., employer, employees, critical colleague, colleague, peers, nuclear family, extended family, close friends, friends, acquaintances, others), hardware currently available or available within a time horizon of a communication attempt (e.g., desktop, laptop, home computer), preferred software (e.g., email, word processing, calendaring) and preferred interruptability (e.g., do not interrupt while focused on work, only interrupt while not focused), for example. While six preferences are identified in the preceding sentence, it is to be appreciated that a greater or lesser number of preferences can be employed in accordance with the present invention.

The contactee data 2050 can also include a context data 2052. The context data 2052 is generally related to observations about the contactee 2030. For example, observations concerning the type of activity in which the contactee 2030 is involved (e.g., on task, not on task), location of the contactee 2030 (e.g., office, home, car, shower), calendar (e.g., appointment status, appointment availability), history of communications with other party (e.g., have replied to email in the past, have spoken to on the telephone recently, the utility of the interaction, the duration of the interaction), background ambient noise at current location, number of hours at work that day and attentional status (e.g., high focus, focus, light focus, conversation with another person, light activity) can be stored in the context data 2052.

On some occasions the context data 2052 may be incomplete (e.g., video analysis data unavailable because video camera broken). Thus, the channel manager 2002 reasons concerning the optimal communication while relying on such incomplete data. Thus, the contactee data 2050 can also include information to facilitate producing one or more probabilities associated with a missing data element. By way of illustration, the contactee data 2050 can contain information operable to predict the likelihood that the contactee 2030 is in a high attentional state even though gaze tracking information is unavailable.

The contactee data 2050 can further include information concerning the long-term and/or acute, dynamically changing communication needs of the contactee 2050. By way of illustration, the contactee 2050 may need to have no interruptions for the next hour (e.g., "hold everything unless high critical on this task or an hour from now"). By way of further illustration, to prevent a contactor 2020 from "ducking" the contactee 2030 by leaving an email or a voice mail when the contactee 2030 desires to speak with the contactor 2020, the contactee 2030 can require that contacts from the contactor 2020 be made in a certain way within X units of time of notification that the contactor 2020 desires communication.

Thus, returning to equation 1, $$A^* = \operatorname*{argmax}_j \sum_i p(\text{context}^R i \mid E) \times \qquad \text{(Equation 1)}$$
$$u(A_j, A_k^C, C, \text{context}^R i, \text{context}^C)$$

the contactee data 2050 is seen to contribute to the utility function u through the $\text{context}^R_i$ component, which can include the contactee context data 2052 discussed above.

In addition to the contactee data 2050 employed in determining the optimal communication, data concerning the contactor 2020 may also be employed. The contactor data 2060 can include hardware, software, context, preference and communication needs data substantially similar to that available for the contactee 2030, but different in that it is prepared from the point of view of the contactor 2020.

Thus, returning again to equation 1, $$A^* = \operatorname*{argmax}_j \sum_i p(\text{context}^R i \mid E) \times \qquad \text{(Equation 1)}$$
$$u(A_j, A_k^C, C, \text{context}^R i, \text{context}^C)$$

the contactor data 2060 is seen to contribute to the utility function u through the $\text{context}^C$ component.

The present invention is not limited to communications between two parties or to a single communication channel between two parties. It is to be appreciated that multiple channels and/or multiple communicating parties can be treated as increased sets of alternatives that complicate utility optimizing maximizing computations without changing the fundamental process of identifying and establishing one or more communication channels based on the preferences, contexts and capabilities of the communicating parties.

The channel manager 2002 can include several computer components responsible for implementing portions of the functionality of the channel manager 2002. For example, the channel manager 2002 can include a preference resolver 2072. The preference resolver 2072 examines the contactee preference data 2054 and the contactor preference data 2064 to find correlations between the two sets of data. In one example of the present invention, information concerning the correlations is stored in a resolved preference data. For group communications, the preference resolver 2072 examines multiple sets of preference data to find correlations between the preferences. By way of illustration, for a communication between two parties, the preference resolver 2072 can determine that both parties would prefer to communicate by high priority email for communications associated with a first task. Similarly, the preference resolver 2072 can determine that the contactee 2030 would prefer to communicate by collaborative editing and phone for communications concerning a particular document, while the contactor 2020 would prefer to communicate only by telephone. Thus, the preference resolver 2072 produces data (e.g., resolved preference data) or initiates processing that assigns values to the correlations between the contactee 2030 preferences and the contactor preferences 2020. In one example aspect of the present invention, the preferences of the contactee 2030 are given more weight, and thus, if the contactor 2020 attempted a phone conversation concerning the document for which the contactee 2030 preferred both phone and collaborative editing, then the preference resolver 2072 produces data or initiates processing that makes it more likely that the contactor 2020 communicates by both phone and collaborative editing. In another example aspect of the present invention, the preferences of the contactor 2020 are given priority over the preferences of the contactee. By way of illustration, when a human contactor 2020 is attempting to communicate with an electronic contactee 2030, the preferences of the contactor 2020 are considered more important, and thus the preference resolver 2072 produces values or initiates processing that makes it more likely that the preferences of the contactor 2020 are observed. In another example aspect of the present invention, the preference resolver 2072 produces a list of potential communication channels ranked on their responsiveness to the preferences.

The channel manager 2002 can also include a context analyzer 2074. The context analyzer 2074 examines the contactee context data 2052 and the contactor context data 2062 to find correlations between the two sets of data. In one example of the present invention, information concerning the correlations is stored in an analyzed context data. For group communications, the context analyzer 2074 may examine multiple sets of context data to extract information concerning the contexts. By way of illustration, for a communication between two parties, the context analyzer 2074 may determine that the contactee context is such that real-time communications are not immediately available but there is an $X_1\%$ likelihood that such communications will be available at a point of time $T_1$ in the future, and an $X_2\%$ likelihood that such communications will be available at a point of time $T_2$ in the future. Further, the context analyzer 2074 may determine that although the contactor 2020 has requested real-time telephony that the context of the contactor 2020 is such that email communication may optimize utility. For example, the context of the contactor 2020 may include information concerning the ambient noise at the location of the contactor 2020. The context analyzer 2074 may determine that the noise level is not conducive to optimizing utility by real-time telephony and thus may produce values and/or initiate processing that will make it more likely that the contactor 2020 will communicate with the contactee 2030 via email. Similar to processing performed by the preference resolver 2072, the context analyzer 2074 may, in different examples of the system 2000, weight the context of the contactee 2030 more than the context of the contactor 2020 or vice versa.

Returning again to equation 1, $$A^* = \underset{j}{\mathrm{argmax}} \sum_i p(\mathrm{context}^R i \mid E) \times \qquad \text{(Equation 1)}$$
$$u(A_j, A_k^C, C, \mathrm{context}^R i, \mathrm{context}^C)$$

the context analyzer 2074 performs processing associated with the utility function u and its analysis of the $\mathrm{context}^R_j$ and the $\mathrm{context}^C$.

The channel manager 2002 can also include a channel analyzer 2076. The channel analyzer 2076 analyzes the communication channel data set 2035. The channel analyzer 2076 produces data concerning the current availability of a communication channel and/or the likelihood of the channel becoming available. In one example of the present invention, such data is stored in a communication channel data. The channel analyzer 2076 also examines one or more channels that the contactor 2020 specified for the communication, and/or one or more channels that the contactee 2030 listed as preferences in the contactee preference data 2054, for example. The channel analyzer 2076 also examines currently available channels as determined by location information associated with the contactee 2030 and channels that may become available based on the activity of the contactee 2030. For example, if the contactee 2030 is currently driving home (as determined by GPS and schedule, for example), then the channel analyzer 2076 examines current cellular channels and additionally examines the channels available at the home of the contactee 2030. Thus, the channel analyzer 2076 facilitates producing data and/or initiating processing that makes it more likely that a desired channel is employed when determining the optimal communication channel(s) for the communication 2010 between the contactor 2020 and the contactee 2030. Thus, examining equation 1, $$A^* = \underset{j}{\mathrm{argmax}} \sum_i p(\mathrm{context}^R i \mid E) \times \qquad \text{(Equation 1)}$$
$$u(A_j, A_k^C, C, \mathrm{context}^R i, \mathrm{context}^C)$$

the channel analyzer 2076 performs processing associated with the utility function u and its analysis of the contactor channels $A_j$ and the contactee channels $A^C_k$.

The channel manager 2002 can also include a communication establisher 2078. Once the ideal communication actions A* have been identified, the communication establisher 2078 undertakes processing to connect the contactor 2020 and the contactee 2030 through the identified optimal communication channel. Such connection can be based, at least in part, on the resolved preference data, the analyzed context data and the communication channel data. For example, if the optimal communication 2010 is identified as being email, then the communication establisher can initiate an email composing process for the contactor 2020 (e.g., email screen on computer, voice to email converter on cell phone, email composer on two-way digital pager), and forward the composed email to the most appropriate email application for the contactee 2030 based on the identified optimal communication 2010. For example, the communication establisher 2078 can forward the email to the pager of the contactee 2030 based on GPS data associated with the location of the contactee 2030. In an alternative example of the present invention, the system 2000 does not include a communication establisher 2078, relying instead on contactor 2020 and/or contactee 2030 actions, for example, to establish the communication. It is to be appreciated that the preference resolver 2072, the context analyzer 2074, the channel analyzer 2076 and the communication establisher 2078 are computer components as that term is defined herein.

Figure 21:
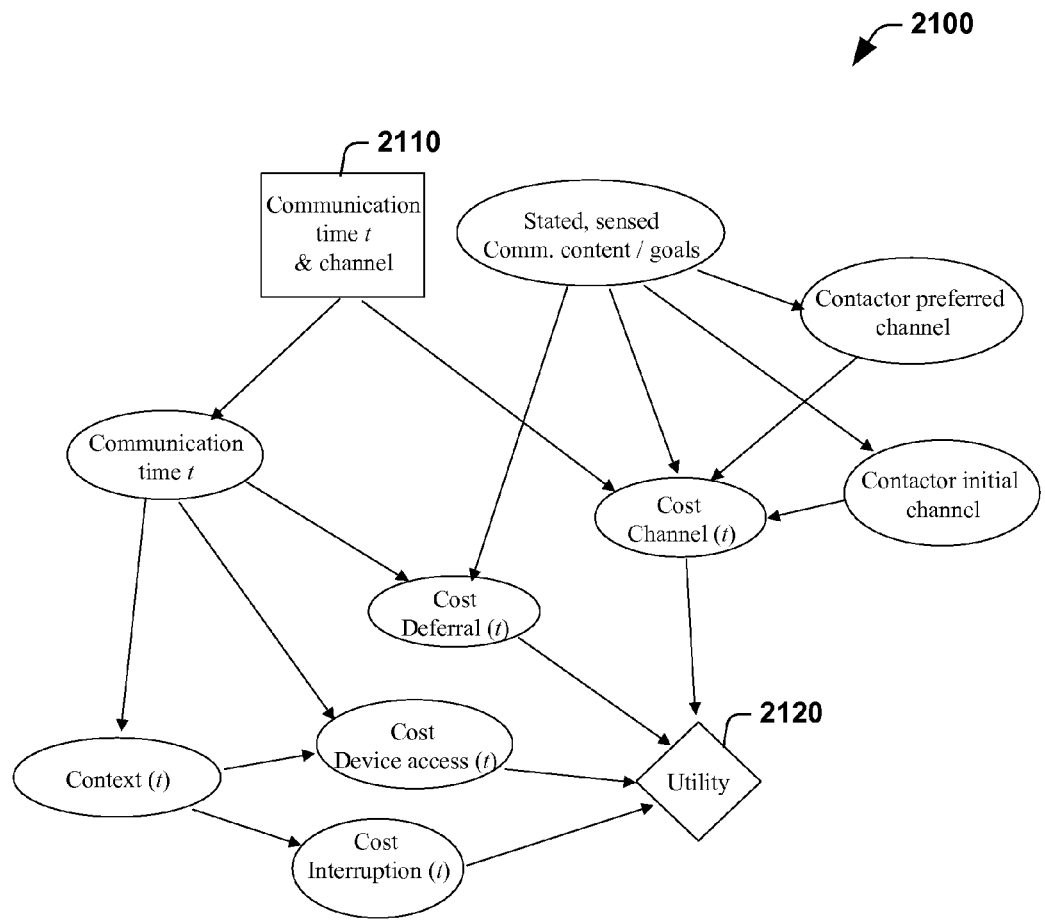
FIG. 21 is an influence diagram associated with a communications schema and process in accordance with an aspect of the present invention.

It is noted that specific decision models can be formulated for computing ideal communications handling. Consider for example, the model 2100 displayed in FIG. 21, represented as an influence diagram. Influence diagrams are a well-known representation of decision problems in the decision science community. The models capture uncertain relationships among key variables, including observational variables, decisions, and value functions. The communications decision-making influence diagram, displayed in FIG. 21, captures the preferences of a recipient of communications. This model 2100 is formulated from the perspective of a recipient of communications, and can drive an automated system via the provision of dynamically computed policies about the handling of the incoming communications. Specifically, this model 2100 can be used to identify the timing and modality actions for incoming calls that minimize cost or, alternatively, maximize expected value for the recipient of communications.

In the model, different actions about the best timing (now, versus reschedule for time t) and channel or modality of an incoming communication is represented by a square 2110, key variables, including observational and inferred variables, are represented by the oval nodes in the graph 2100, and a diamond 2120 represents the value or cost associated with decisions. Directed arcs represent probabilistic or deterministic dependence among variables. In the model 2100, key variables include the cost of interruption now and at future times t, the cost of deferring the communication for time t, the cost associated with accessing different devices (capturing device availability), and the cost of choosing a suboptimal channel, such as committing to use a cell phone to access a communication that might rely to some extent on the sharing of graphical content. As indicated by the dependencies, data representing or allowing inference about the recipient's context at the time of the communication indicates influences the cost of interruption. The cost of device availability is influenced by the time of the communication and the context at that time. The cost of deferral is influenced by the time of the communication and the asserted or inferred goals and type of content of the communication. The cost associated with different communication channels or modalities is influenced by the initial channel selected by the contactor, the nature of the goals and content, and a specification, when available, of the contactor's preferences about channels or modalities for the communication. The time of the communication also influences the context of the user, the cost of deferral, and the cost of use of different channels. Inference from relevant observational data and among key variables represented in this decision model can provide deterministic or probabilistic values for states of key variables that influence the utility of different actions. When such a model is solved in real-time, given a set of observations, including relevant data transmitted in a communications schema, multiple times and modalities are considered and the time and modality that optimizes the utility or equivalently minimizes the expected cost of the communication is selected, and this policy is executed. In cases where uncertainty remains among variables, an action that maximizes expected utility or that minimizes expected cost is selected.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A method of processing a communication between a contactor and a contactee, the method comprising:
    acquiring information relating to processing the communication between the contactor and the contactee, the information comprising at least one of:
        a type of activity in which at least one of the contactor and the contactee is involved,
        a preferred communication policy related to a priority of the communication, and
        an attentional status of at least one of the contactor and the contactee;
    generating, based on the acquired information, a schema comprising a plurality of elements;
    populating at least one element of the plurality of elements of the schema with data extracted from the acquired information;
    at a computing device associated with the contactee:
        receiving a data packet, the data packet comprising:
            a first field that stores a source identifier that identifies a computer component from which the data packet originated;
            a second field that stores a destination identifier that identifies a computer component to which the data packet is destined; and
            a third field that stores a schema identifier that identifies the schema with which the data packet is associated, the schema comprising the information relating to processing the communication between the contactor and the contactee;
        using the schema identifier to access the schema to access the at least one element to obtain the information related to processing the communication;
        using the obtained information to compute an indication of cost or value of the communication to at least one of the contactor or the contactee; and
        routing the communication based on the computed indication.

2. The method of claim 1, where the schema identifier is at least one of a globally unique identifier, a uniform resource locator and a path name.

3. The method of claim 1, wherein using the schema identifier to access the schema to obtain the information related to processing the communication comprises accessing a computing device separate from the computing device associated with the contactee.

4. A method of processing a communication between a contactor and a contactee, the method comprising:
    at a computing device associated with the contactee:
        receiving a data packet, the data packet comprising:
            a first field that stores preference data associated with a communicating party from at least one of the contactor or the contactee; and
            a second field that stores context data associated with the communicating party;
        generating, based on the preference data and the context data, a schema comprising a plurality of elements and a plurality of attributes;
        parsing the preference data and the context data to extract at least one first value to populate at least one element from the plurality of elements of the schema and at least one second value to populate at least one attribute from the plurality of attributes of the schema;

storing the at least one first value in the at least one element of the schema and the at least one second value in the at least one attribute of the schema;

receiving a communication from the contactor directed to the contactee; and selectively routing the communication based on the schema by selectively routing the communication based on the at least one first value and the at least one second value extracted from the preference data and the context data.

5. The method of claim 4, where the preference data comprises a data associated with deterministic preference values, and an inference concerning one or more non-deterministic preference values.

6. The method of claim 4, where the preference data comprises at least one of a preferred communication time, a preferred communication day, a preferred communicating party, a preferred hardware, a preferred software, a preferred communication policy, and a preferred interruptability data.

7. The method of claim 4, where the context data comprises a data associated with deterministic context values, and an inference concerning one or more non-deterministic context values.

8. The method of claim 4, where the context data comprises at least one of an activity type, a location, a calendar, a communication history, an ambient noise data, a time on task data, a gaze track data, a communication needs data, and an attentional status data.

9. The method of claim 4, wherein the data packet comprises a third field that stores a group data associated with at least one of the contactor and the contactee.

10. The method of claim 4, where the group data comprises at least one of a group identity data, a group preference data, and a group context data.

11. The method of claim 9, where the group identity data comprises at least one of a group name, a group membership, a group classification data and a group inclusion criteria data.

12. The method of claim 11, where the group classification data comprises at least one of, a group formation data, a group addition data, a group deletion data, a group update data, and a group creator metadata associated.

13. The method of claim 11, where the group inclusion criteria data is information concerning traits that make a communicating party eligible for membership in the group, the information comprising, at least one of, a membership of a communicating party in an address book, a time since the communicating party last communicated, a time left until a deadline, a membership of the communicating party in a collection, a degree to which a communicating party is trusted, and the identity of a communication initiator.

14. The method of claim 4, where the group relevant data comprises at least one of a group hardware preference, a group software preference, a group membership preference, and a group communication time preference.

15. The method of claim 4, where the group relevant data comprises at least one of a group hardware context, a group software context, and a group availability context.

16. The method of claim 4, wherein the data packet comprises a third field that stores a time away data associated with at least one of the contactor or the contactee.

17. The method of claim 16, where the time away data comprises at least one of a current time away from a task data, a current time away from a computer component data, a current time away from a contextual data item state, a historical time away from a task data, a historical time away from a computer component data, a historical time away from a contextual data item state, information associated with the likelihood that a person will return to a task, information associated with the likelihood that a person will return to a computer component, calendar data, and information associated with the likelihood that a person will return to a contextual data item state.

18. The method of claim 4, wherein the data packet comprises a third field that stores a reliability data associated with a communication channel along which the managed communicating will occur.

19. The method of claim 18, where the reliability data comprises at least one of a current likelihood of degradation, an expected likelihood of degradation, a current disconnection likelihood, an expected disconnection likelihood, a current security compromise likelihood, an expected security compromise likelihood, a communication channel mean time between failure, an average communication channel failure duration, an average communication channel percent degradation, an atmospheric condition data, a scheduled communication channel maintenance data, a scheduled communication channel downtime data, an expected communication duration, a communication channel reliability history, a lost connection cost, a reconnecting cost, a communicating party attentional status, a communicating party activity, a partially completed communication utility, a lost connection frustration factor cost, a lost connection monetary cost, a lost connection opportunity cost, a reconnection time delay cost, and an embarrassment cost.

20. A method of processing a communication between a contactor and a contactee, the method comprising:

at a computing device associated with the contactee:

receiving a data packet comprising:

a first field that stores preference data associated with a communicating party; and a second field that stores context data associated with the communicating party, wherein the context data comprises a task in which at least one of the contactee and the contactor is engaged;

generating, based on the preference data and the context data, a schema comprising a plurality of elements;

parsing the preference data and the context data to extract at least one value to populate at least one element from the plurality of elements of the schema;

storing the at least one value in the at least one element of the schema;

receiving a communication from the contactor directed to the contactee;

accessing the at least one element of the schema to obtain the at least one value to compute, based on the at least one value, an indication of an expected utility of the communication to at least one of the contactor and the contactee, wherein the expected utility indicates a value of the communication to at least one of the contactor and the contactee; and selectively routing the communication based on the indication of the expected utility.

* * * * *